(12) United States Patent
Jackson et al.

(10) Patent No.: US 9,885,940 B2
(45) Date of Patent: Feb. 6, 2018

(54) CAMERA CARRYING AND MOUNTING SYSTEM

(71) Applicants: Joseph Walter Jackson, Wilmington, DE (US); Andrew Douglas Johnson, Wilmington, DE (US)

(72) Inventors: Joseph Walter Jackson, Wilmington, DE (US); Andrew Douglas Johnson, Wilmington, DE (US)

(73) Assignee: ASFERIK, LLC, Wilmington, DE (US)

( * ) Notice: Subject to any disclaimer, the term of this patent is extended or adjusted under 35 U.S.C. 154(b) by 0 days.

(21) Appl. No.: 15/003,759

(22) Filed: Jan. 21, 2016

(65) Prior Publication Data
US 2016/0209734 A1 Jul. 21, 2016

Related U.S. Application Data

(60) Provisional application No. 62/106,063, filed on Jan. 21, 2015.

(51) Int. Cl.
*G03B 17/56* (2006.01)

(52) U.S. Cl.
CPC ......... *G03B 17/561* (2013.01); *G03B 17/563* (2013.01); *G03B 17/566* (2013.01)

(58) Field of Classification Search
USPC ....................................................... 396/422
See application file for complete search history.

(56) References Cited

U.S. PATENT DOCUMENTS

| 3,704,537 A | 12/1972 | McKinzie |
| 3,762,616 A | 10/1973 | Brunstetter |
| 4,091,402 A | 5/1978 | Siegel |
| 4,209,157 A * | 6/1980 | Edmisten ............... F41C 33/00 248/691 |
| 4,328,917 A | 5/1982 | Reeberg |

(Continued)

FOREIGN PATENT DOCUMENTS

| EP | 1 160 499 | 5/2001 |
| JP | 2004-320695 | 11/2004 |

OTHER PUBLICATIONS

*US 1885 Carbine Sling*, http://www/rollanet.org/stacyw/us_1885_carbine_sling.htm (last visited Sep. 15, 2014).

(Continued)

*Primary Examiner* — Clayton E Laballe
*Assistant Examiner* — Linda B Smith
(74) *Attorney, Agent, or Firm* — Finnegan, Henderson, Farabow, Garrett & Dunner, L.L.P.

(57) ABSTRACT

Embodiments of the present disclosure include a camera carrying and mounting system. The system may include a camera plate configured to mount onto a camera and a coupling mechanism. The camera plate may include a first end, a second end, and a mounting hole configured to receive a fastening element to mount the camera plate to the camera, and the mounting hole may be positioned between the first end and the second end of the camera plate. The coupling mechanism may be coupled to the first end of the camera plate and configured to releasably engage a carrying structure to the camera plate, and the coupling mechanism may include a loop through which the carrying structure extends.

18 Claims, 25 Drawing Sheets

(56) References Cited

U.S. PATENT DOCUMENTS

| | | | |
|---|---|---|---|
| 4,386,724 A | 6/1983 | Kotler | |
| 4,454,675 A | 6/1984 | Ives | |
| 4,505,012 A | 3/1985 | Johnson | |
| 4,841,658 A | 6/1989 | Katsenes | |
| 5,067,267 A | 11/1991 | Ives | |
| 5,517,839 A | 5/1996 | Parsons | |
| 5,692,654 A | 12/1997 | Bell | |
| 6,178,600 B1 * | 1/2001 | French | F41C 23/02 24/2.5 |
| D444,201 S | 6/2001 | Norris, Sr. | |
| 6,354,034 B1 | 3/2002 | Norris, Sr. | |
| 6,536,154 B1 | 3/2003 | Norris | |
| 6,791,770 B2 | 9/2004 | Yamazaki | |
| 7,654,027 B1 | 2/2010 | Grover | |
| 7,654,028 B1 | 2/2010 | Grover | |
| 7,866,899 B2 | 1/2011 | Kope et al. | |
| 8,047,729 B2 | 11/2011 | Kope et al. | |
| 8,678,678 B2 | 3/2014 | Imura | |
| 8,727,642 B1 | 5/2014 | Tse | |
| 8,910,679 B2 * | 12/2014 | Avganim | A45C 13/20 150/100 |
| 8,979,397 B2 * | 3/2015 | Henry | G03B 17/561 396/423 |
| 9,383,631 B2 * | 7/2016 | Jackson | G03B 17/561 |
| 2005/0199662 A1 * | 9/2005 | Rekuc | A45C 13/30 224/264 |
| 2008/0061009 A1 | 3/2008 | Muse et al. | |
| 2011/0017896 A1 | 1/2011 | Bordignon | |
| 2012/0043360 A1 | 2/2012 | Kope et al. | |
| 2012/0048901 A1 * | 3/2012 | Wong | A45F 5/00 224/257 |
| 2012/0167353 A1 * | 7/2012 | Geller | A45F 5/00 24/302 |
| 2013/0101280 A1 * | 4/2013 | Xu | G03B 17/566 396/423 |
| 2013/0193294 A1 * | 8/2013 | Li | F16M 11/041 248/371 |
| 2013/0256484 A1 | 10/2013 | Kessler et al. | |
| 2013/0312232 A1 * | 11/2013 | Fujiwara | G03B 17/566 24/572.1 |
| 2014/0050468 A1 | 2/2014 | Henry et al. | |
| 2014/0093230 A1 | 4/2014 | Hale | |
| 2014/0158845 A1 | 6/2014 | Fliger | |
| 2015/0370149 A1 | 12/2015 | Jackson et al. | |

OTHER PUBLICATIONS

*Leica Goodies*, http://wayback.archive.org/web/20051025004950/http:/www.leicagoodies.com/ (last visited Jun. 18, 2015).

* cited by examiner

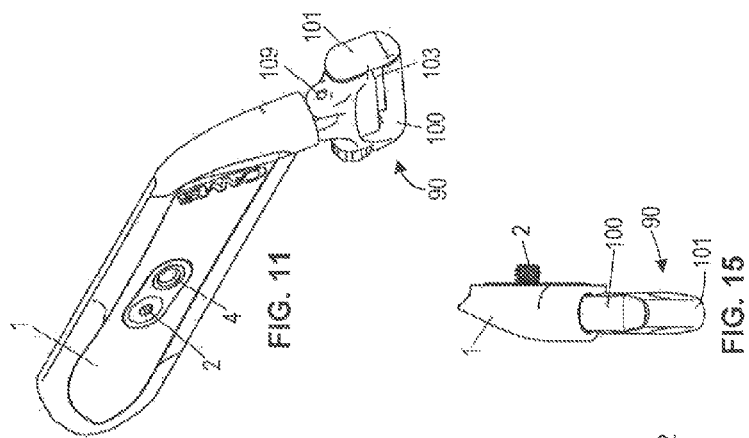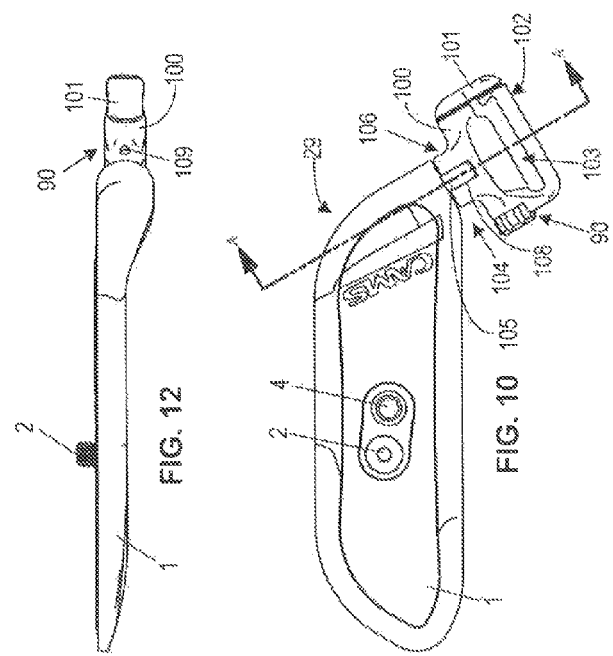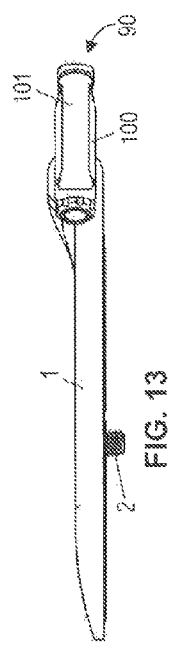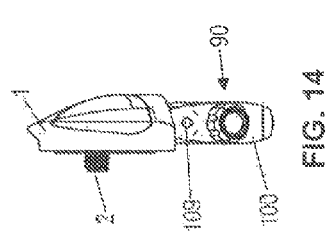

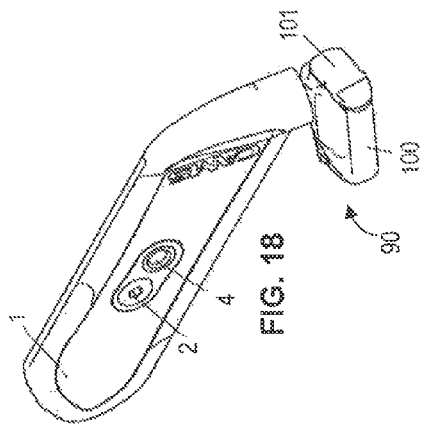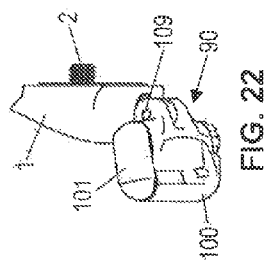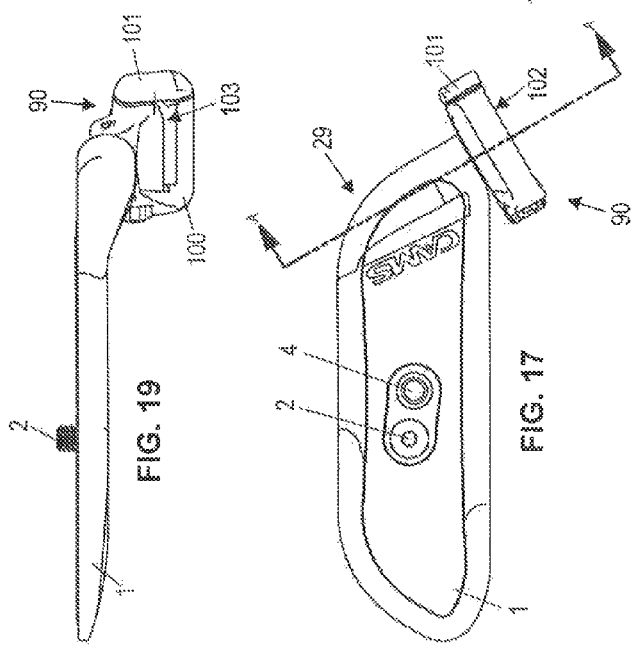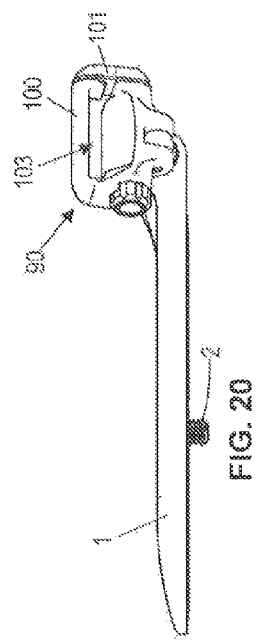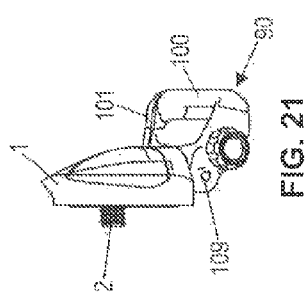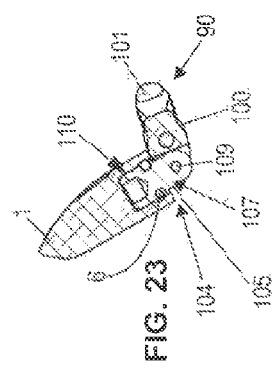

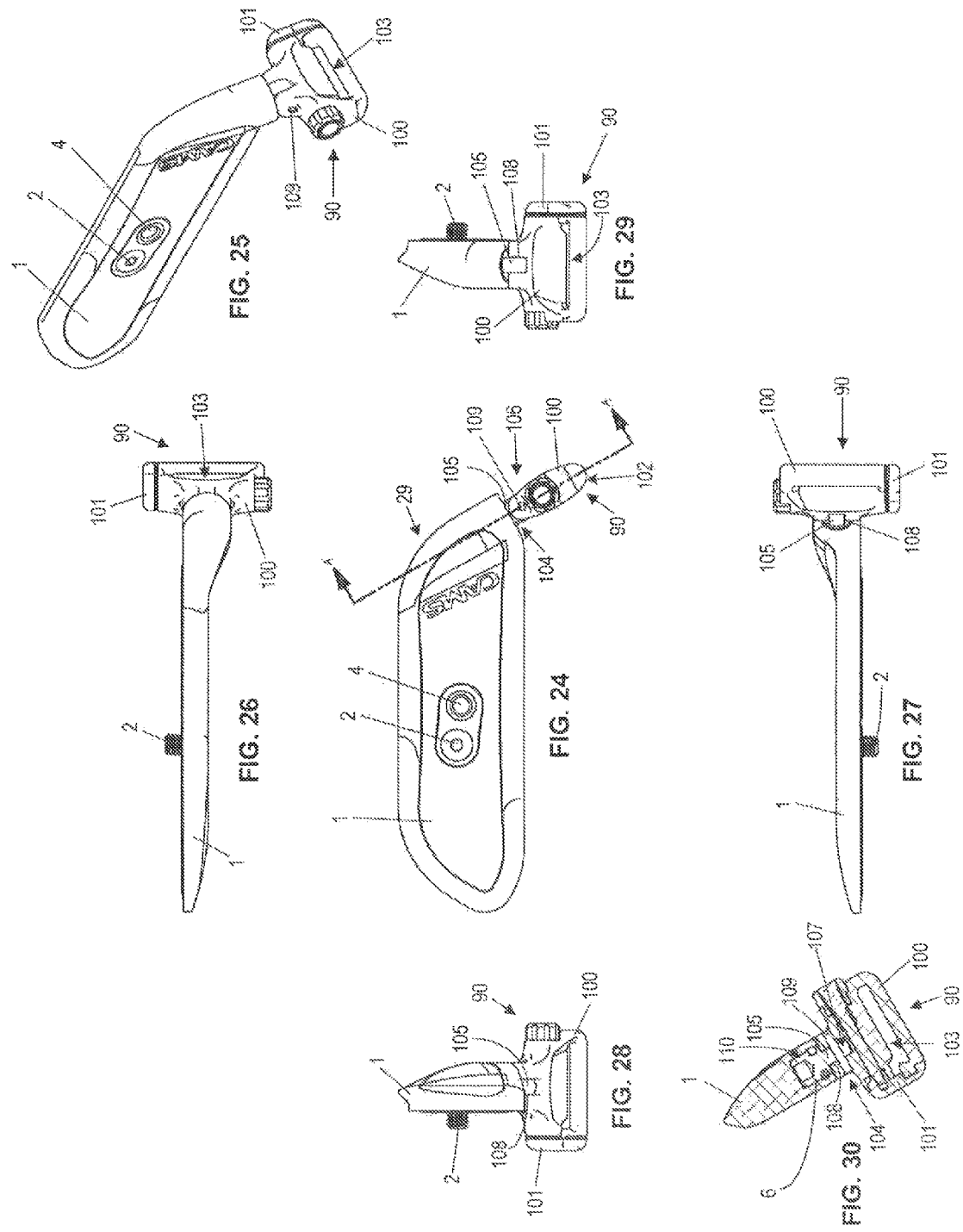

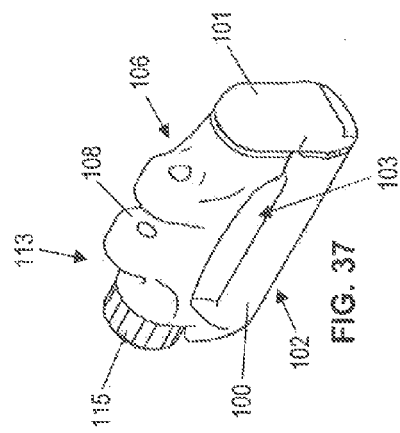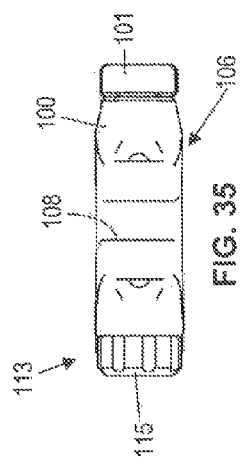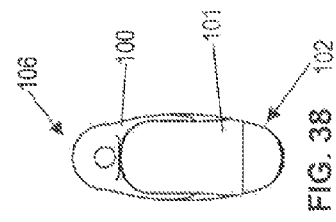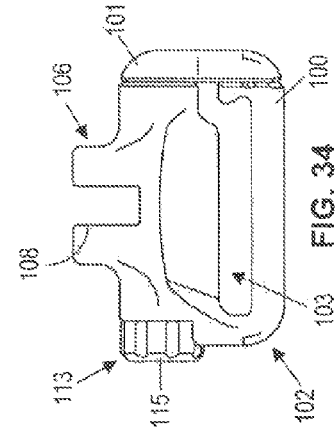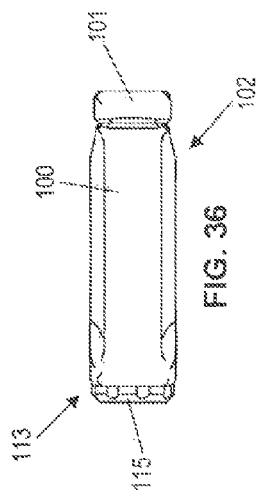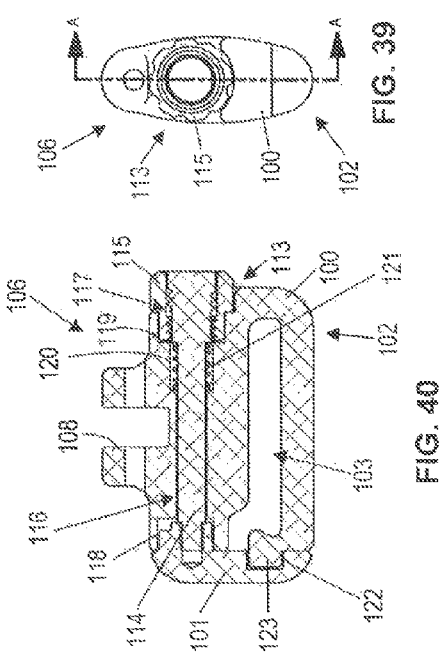

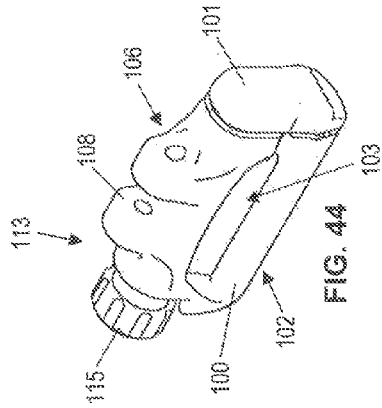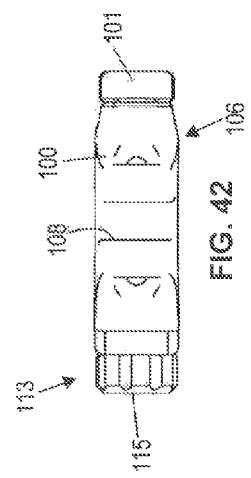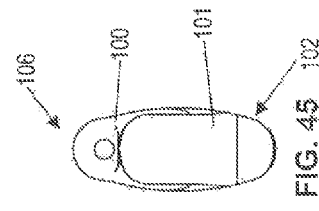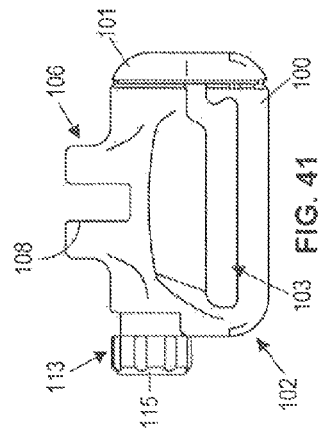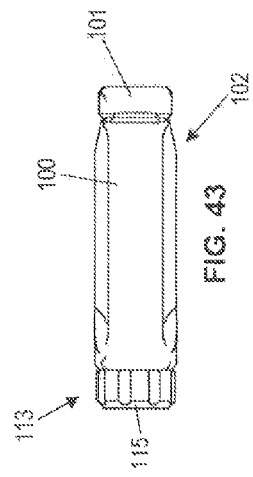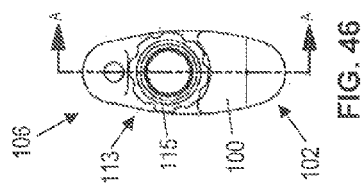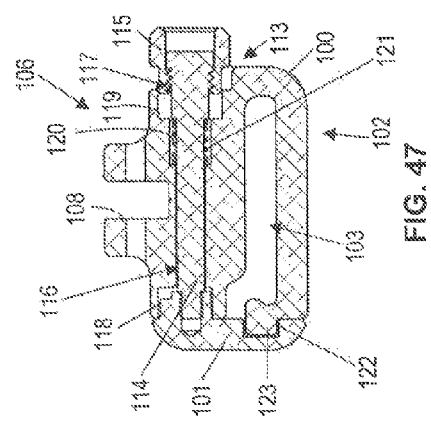

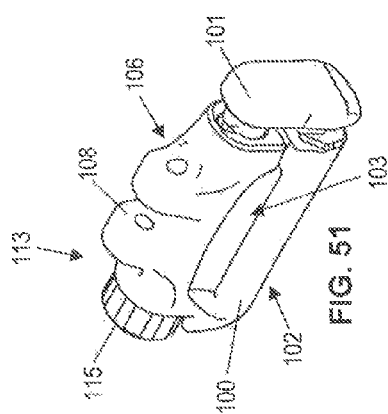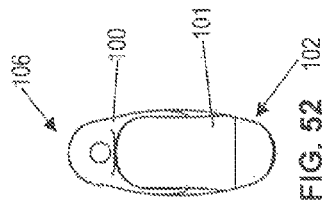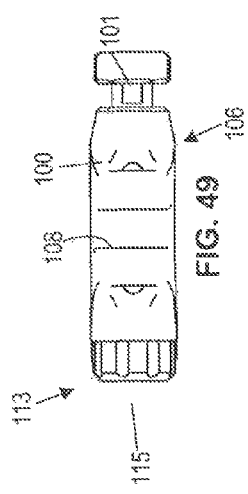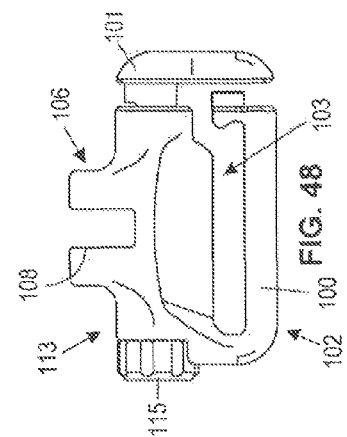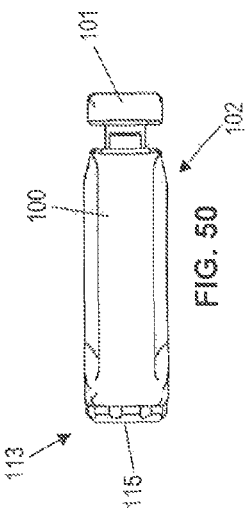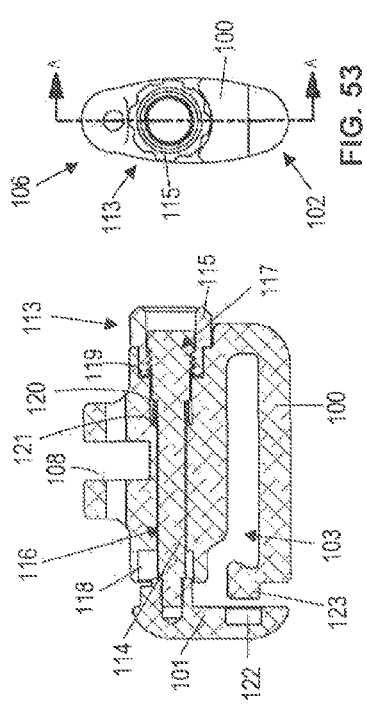

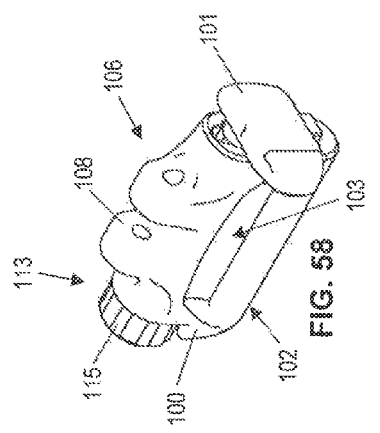
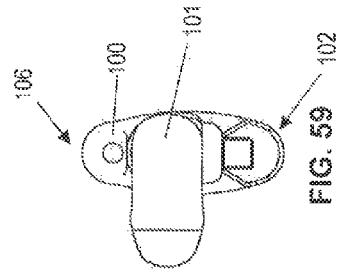
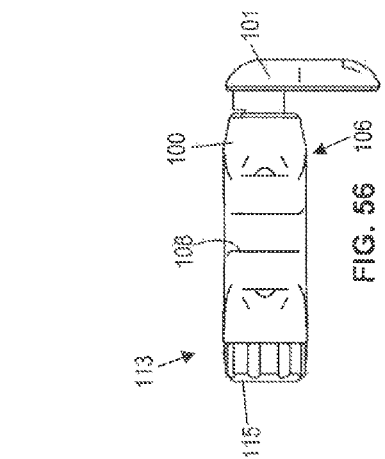
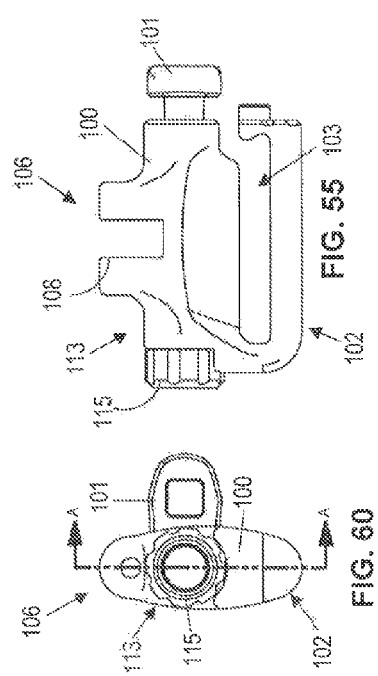
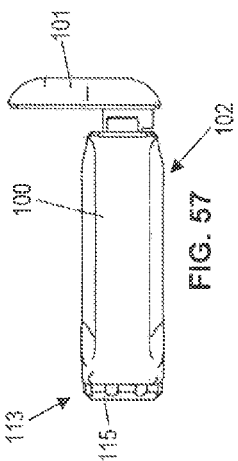
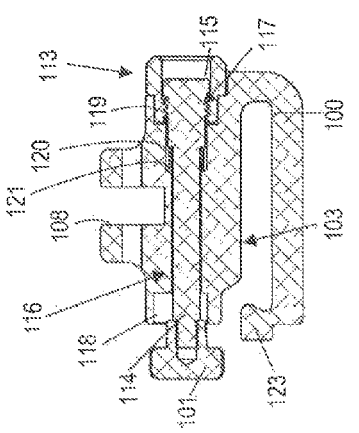

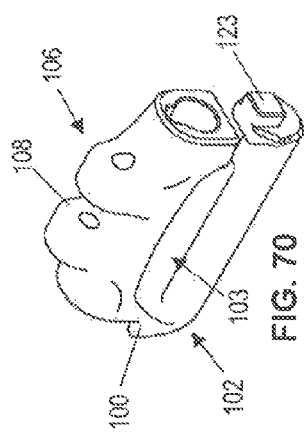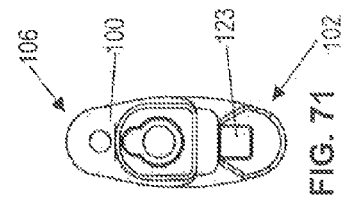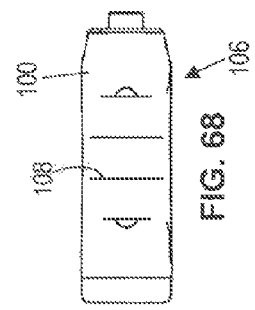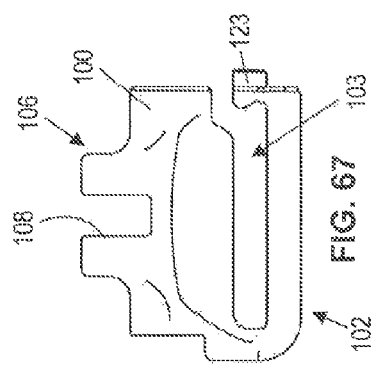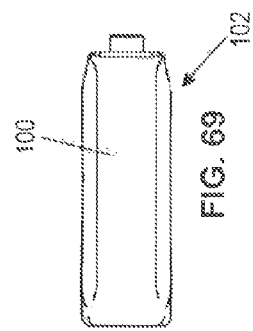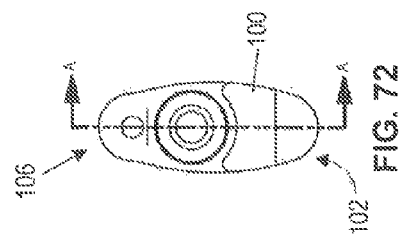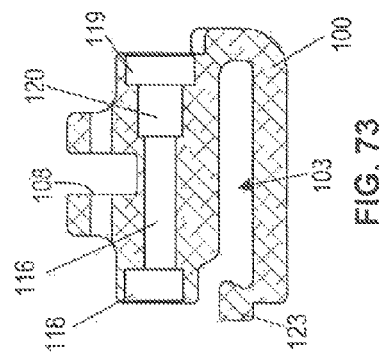

CAMERA CARRYING AND MOUNTING SYSTEM

CROSS-REFERENCE TO RELATED APPLICATION

This application claims the benefit of priority under 35 U.S.C. § 119 to U.S. Provisional Patent Application No. 62/106,063, filed on Jan. 21, 2015, which is incorporated herein by reference in its entirety.

FIELD OF THE DISCLOSURE

Embodiments of the present disclosure include a camera carrying and mounting system, and more particularly, a camera carrying and mounting system including a mounting plate and a coupling mechanism for engaging and disengaging a carrying structure, such as a shoulder strap, belt, backpack strap, and the like.

BACKGROUND OF THE DISCLOSURE

Generally speaking, conventional cameras include structures for mounting to camera stands, such as a monopod or tripod. These structures include, for example, a threaded socket positioned on a base of the camera, which is configured to mate with a threaded element (e.g., a screw) of the camera stand. In certain applications, camera carrying mechanisms utilize the threaded socket of the camera for coupling a carrying structure, such as a shoulder strap, to the camera. The camera carrying mechanisms include, for example, a first structure having a threaded element to mate with the threaded socket of the camera base and a second structure having an engagement portion, such as, a hook or clip, for coupling to the carrying structure.

These camera carrying mechanisms, however, may have a number of shortcomings. For one, the carrying mechanism may be cumbersome for the camera user, particularly when the user takes photographs in a vertical (portrait) orientation. The coupling mechanism may interfere with the user when the user grips the base of the camera in the vertical shooting orientation. For example, the protruding geometry and hard edges of the coupling mechanism may cause discomfort and instability when a user grips the base of the camera for a vertical shot. The same issues arise in instances in which the coupling mechanism is engaged with a collar of a camera lens. Particularly, the protruding geometry of the coupling may cause discomfort when the user grasps the underside of the camera lens when attempting to stabilize the camera lens. These discomforts may lead to user fatigue and decreased steadiness of the camera, which ultimately may result in lower quality photographs.

In addition, existing camera carrying mechanisms may be inconvenient when the user desires to use a camera stand, as the user would need to disengage the carrying mechanism from the threaded socket of the camera before mounting the camera to the stand. And if the user desires to employ a camera stand having releasable clamps, the user may also be required to install a separate stand plate to the camera for engaging with the the releasable clamps of the camera stand. The time needed to disengage the coupling mechanism in order to engage the camera to the camera stand may result in lost photographic opportunities, i.e., missing a chance for a critical picture.

The present disclosure is directed to improvements in the existing technology.

SUMMARY OF THE DISCLOSURE

In accordance with an embodiment, a camera carrying and mounting system may include a camera plate configured to mount onto a camera and a coupling mechanism. The camera plate may include a first end, a second end, and a mounting hole configured to receive a fastening element to mount the camera plate to the camera, and the mounting hole may be positioned between the first end and the second end of the camera plate. The coupling mechanism may be coupled to the first end of the camera plate and configured to releasably engage a carrying structure to the camera plate, and the coupling mechanism may include a loop through which the carrying structure extends.

In accordance with another embodiment, a camera carrying and mounting system may include a camera plate configured to mount onto a camera and a coupling mechanism coupled to the camera plate. The coupling mechanism may be configured to releasably engage a carrying structure to the camera plate, and the coupling mechanism may remain coupled to the camera plate when disengaging the carrying structure from the camera plate. The coupling mechanism may be configured to rotate relative to the camera plate.

In yet another embodiment, a camera carrying and mounting system may include a camera plate configured to mount onto a camera and a coupling mechanism coupled to the camera plate. The coupling mechanism may include a body portion and an arm, wherein the arm may be configured to move relative to the body portion to releasably engage a carrying structure to the coupling mechanism. The camera plate may be configured to secure the camera to a camera stand with the coupling mechanism remaining coupled to the camera plate.

BRIEF DESCRIPTION OF THE DRAWINGS

FIGS. 10-15 illustrate various views of the camera plate and another coupling mechanism of a camera carrying and mounting system, according to an exemplary disclosed embodiment;

FIG. 16 illustrates a cross-sectional view along line A-A of the camera plate and the coupling mechanism depicted in FIG. 10, according to an exemplary disclosed embodiment;

FIGS. 17-22 illustrate various views of the camera plate and the coupling mechanism depicted in FIGS. 10-16 with the coupling mechanism pivoted, according to an exemplary disclosed embodiment;

FIG. 23 illustrates a cross-sectional view along line A-A of the camera plate and the coupling mechanism depicted in FIG. 17, according to an exemplary disclosed embodiment;

FIGS. 24-29 illustrate various views of the camera plate and the coupling mechanism depicted in FIGS. 10-16 with the coupling mechanism rotated, according to an exemplary disclosed embodiment;

FIG. 30 illustrates a cross-sectional view along line A-A of the camera plate and the coupling mechanism depicted in FIG. 24, according to an exemplary disclosed embodiment;

FIGS. 34-39 illustrate various views of components of the coupling mechanism depicted in FIGS. 10-30 in a closed and locked configuration, according to an exemplary disclosed embodiment;

FIG. 40 illustrates a cross-sectional view along line A-A of the components of the coupling mechanism depicted in FIG. 39, according to an exemplary disclosed embodiment;

FIGS. 41-46 illustrate various views of components of the coupling mechanism depicted in FIGS. 10-30 in an unlocked configuration, according to an exemplary disclosed embodiment;

FIG. 47 illustrates a cross-sectional view along line A-A of the components of the coupling mechanism depicted in FIG. 46, according to an exemplary disclosed embodiment;

FIGS. 48-53 illustrate various views of components of the coupling mechanism depicted in FIGS. 10-30 in an unlocked and open configuration, according to an exemplary disclosed embodiment;

FIG. 54 illustrates a cross-sectional view along line A-A of the components of the coupling mechanism depicted in FIG. 53, according to an exemplary disclosed embodiment;

FIGS. 55-60 illustrate various views of components of the coupling mechanism depicted in FIGS. 10-30 with an arm moved away from a body portion of the coupling mechanism, according to an exemplary disclosed embodiment;

FIG. 61 illustrates a cross-sectional view along line A-A of the components of the coupling mechanism depicted in FIG. 60, according to an exemplary disclosed embodiment;

FIGS. 67-72 illustrate various views of a body portion of the coupling mechanism depicted in FIGS. 10-30, according to an exemplary disclosed embodiment;

FIG. 73 illustrates a cross-sectional view along line A-A of the body portion of the coupling mechanism depicted in FIG. 72, according to an exemplary disclosed embodiment;

DETAILED DESCRIPTION

Reference will now be made in detail to the exemplary embodiments of the present disclosure described above and illustrated in the accompanying drawings.

Figure 1:
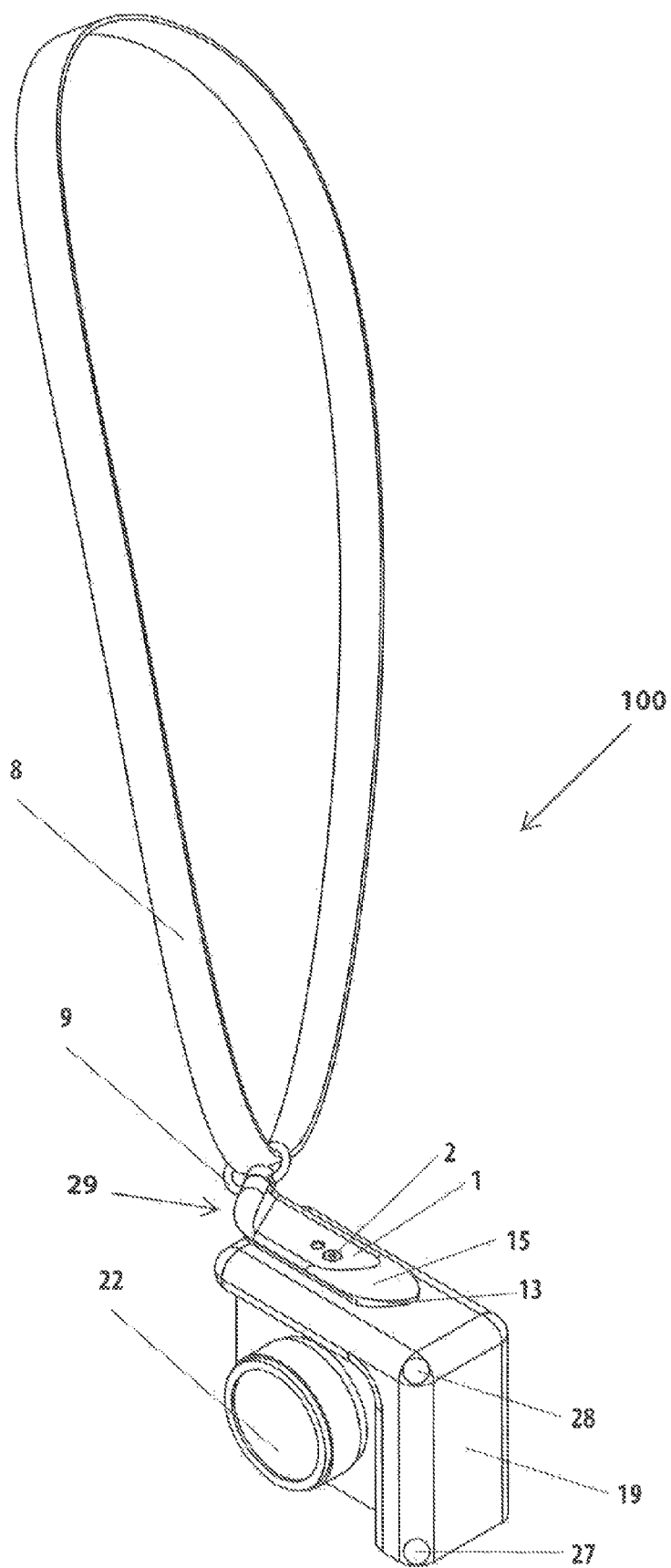
FIG. 1 illustrates a perspective view of a camera carrying and mounting system, according to an exemplary disclosed embodiment.

FIG. 1 illustrates a camera carrying and mounting system 100 coupled to a camera 19, according to an exemplary disclosed embodiment. As will be described in more detail below, camera carrying and mounting system 100 may include a camera plate 1 configured to mount onto camera 19 and a coupling mechanism 9 configured to readily engage and disengage a carrying structure 8, such as, for example, a shoulder strap, belt, backpack strap, and the like. Camera 19 may be any conventional camera known in the art. In certain embodiments, and as illustrated in FIG. 1, for example, camera 19 may include a first shutter release button 27, a second shutter release button 28 and a lens 22. First and second shutter release buttons 27, 28 may be conventional push-buttons on camera 19, each of which may be actuated by the user to take a photograph.

Figure 2:
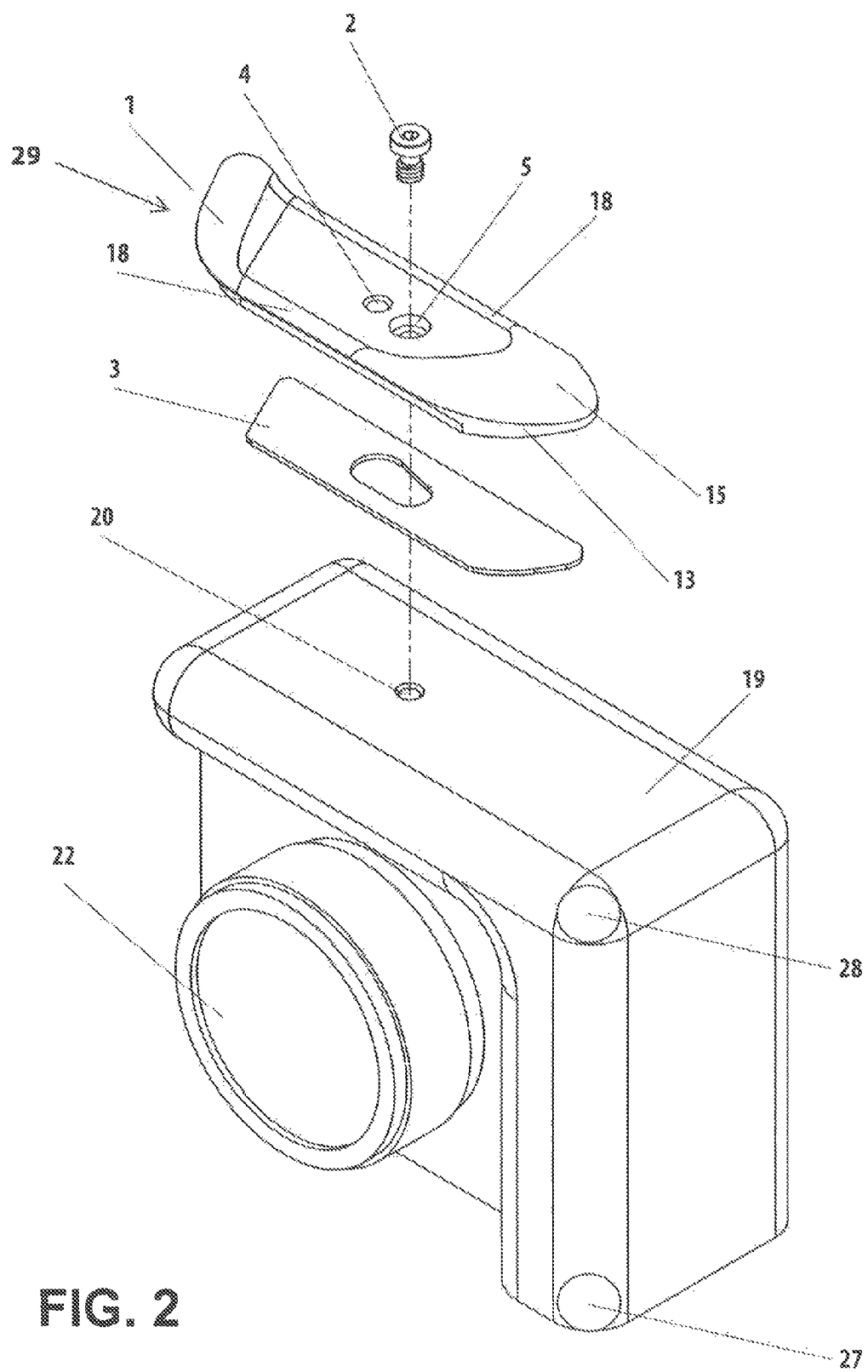
FIG. 2 illustrates a disassembled view of components of the camera carrying and mounting system, according to an exemplary disclosed embodiment.

FIG. 2 illustrates disassembled components of camera plate 1 relative to camera 19, according to an exemplary disclosed embodiment. As alluded to above, camera plate 1 may be configured to mount onto a base of camera 19. In particular, a fastening element 2, such as, for example, a threaded screw or any other suitable fastener, may couple camera plate 1 to the camera base by mating with a socket 20 positioned on a base of camera 19. In certain embodiments, socket 20 of camera 19 may be a conventional threaded socket configured to mate with a threaded element (e.g., a screw) of a camera stand, such as a monopod or tripod. As shown in FIG. 2, for example, camera plate 1 may include a counter-bored hole 5 through which fastening element 2 may pass for engaging socket 20 and mounting camera plate 1 to camera 19. Camera plate 1 may also include a bore 4 adjacent to counter-bored hole 5. Bore 4 may facilitate the mounting of camera 19 to any conventional camera strand, such as, for example, a monopod or a tripod. In certain embodiments, for example, bore 4 may be threaded and configured to mate with a threaded element (e.g., a screw) of the camera stand. In other embodiments, for example, bore 4 may be configured to receive an insert having a threaded bore for mating with the threaded element of the camera stand. It should also be appreciated that bore 4 may be positioned adjacent to hole 5 to allow camera 19 to be appropriately balanced over the camera stand. In addition, bore 4 may be centered relative to the peripheral edges of camera plate 1 to maximize surface contact between camera plate 1 and the camera stand for increased security and stability. In certain other embodiments, an insert having a threaded bore may be passed through hole 5 and into socket 20 of camera 19 to fasten camera plate 1 to camera 19. The threaded bore of the insert may be configured to engage with a threaded element of a camera stand, thereby obviating the need for bore 4.

In some embodiments, and as shown in FIG. 2, for example, camera plate 1 may include a gripping element 3 positioned on a face of camera plate 1 that is mounted to the base of camera 19. Gripping element 3 may include, for example, a rubber sheet or padding having ridges, and may be configured to cushion the interface between camera plate 1 and the base of camera 19 and also provide grip therebetween. The grip provided by gripping element 3 may be configured to resist and/or prevent movement between camera plate 1 and camera 19 when a user grasps and handles a base of camera 19 or when carrying camera 19.

Figure 3:
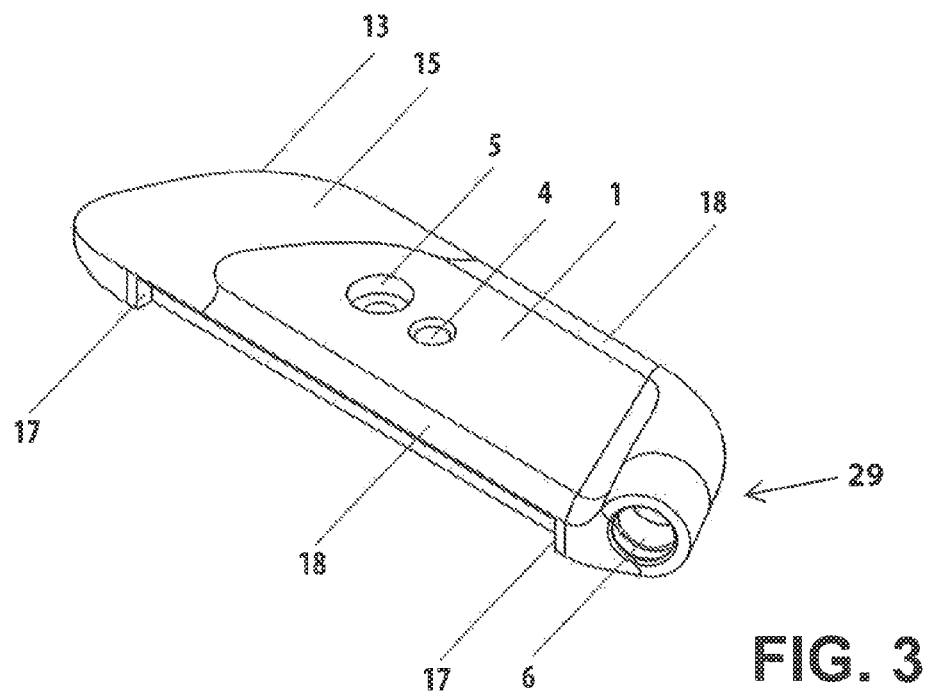
FIG. 3 illustrates a perspective view of a camera plate of the camera carrying and mounting system, according to an exemplary disclosed embodiment.
Figure 4:
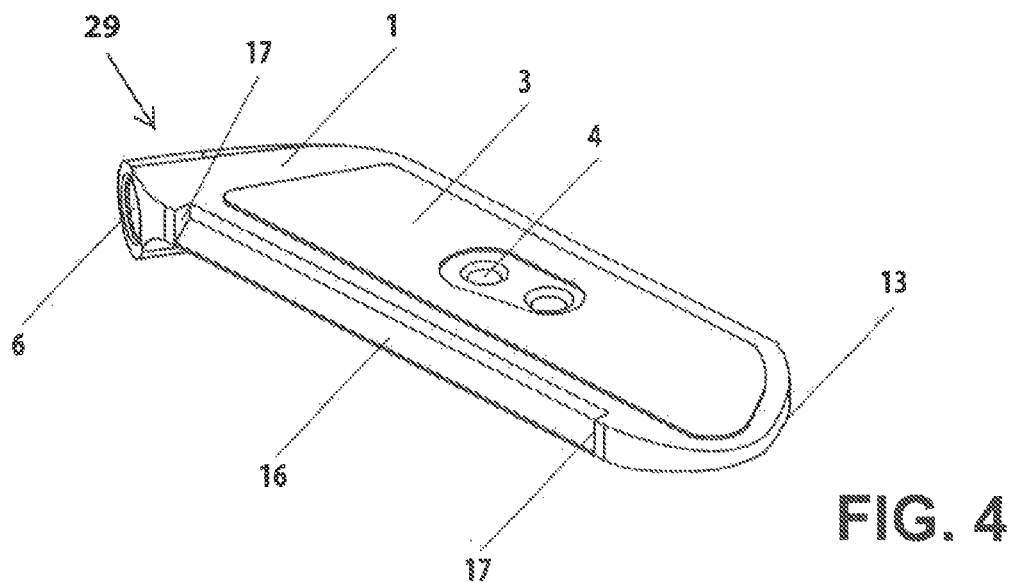
FIG. 4 illustrates a perspective view of the camera plate of the camera carrying and mounting system, according to an exemplary disclosed embodiment.

FIGS. 3 and 4 illustrate additional views of camera plate 1, according to an exemplary disclosed embodiment. FIG. 3 illustrates a view of a top side of camera plate 1. The top side of camera plate 1 may be the side of camera plate 1 that the user grasps when holding and handling the base of camera 19. FIG. 4 illustrates a view of a bottom side of camera plate 1. The bottom side of camera plate 1 may be the side of camera plate 1 that engages the base of camera 19. Camera plate 1 may further include a shoulder 29 onto which coupling mechanism 9 may be attached. In some embodiments, for example, shoulder 29 may include a channel 6 into which coupling mechanism 9 may be engaged and secured. Camera plate 1 may also include a first end and a second end, and bore 4 and counter-bored hole 5 may be positioned between the first and second ends.

Coupling mechanism 9 may be positioned at a first end of camera plate 1. For example, and with reference to FIG. 1, shoulder 29 may also be defined at the first end of camera plate 1, and coupling mechanism 9 may be engaged with camera plate 1 at shoulder 29. Moreover, in certain embodiments, shoulder 29 may be oriented at an angle relative to a longitudinal axis of camera plate 1. Accordingly, when the user grasps camera plate 1 at a base of camera 19, coupling mechanism 9 and strap 8 may not interfere with the user. Furthermore, by being positioned on an end of camera plate 1, shoulder 29 and coupling mechanism 9 may provide a more comfortable configuration for camera 19 when the user carries camera 19 with strap 8. For instance, the base of camera 19 may lie more vertically relative to the user's side when strap 8 is placed over the user's shoulder, resulting in a more compact configuration.

As shown in FIGS. 3 and 4, for example, camera plate 1 may also include an appropriate ergonomic shape, allowing a user to securely and comfortably grasp camera plate 1 when orienting camera 19 for vertical shooting. In some embodiments, the second end of camera plate 1 opposite the first end on which shoulder 29 is defined may be appropriately shaped to facilitate the user in securely and comfortably holding and handling camera plate 1, and thus camera 19. For example, the second end of camera plate 1 may include a truncated edge 13 angled toward a side of camera plate 1 opposite channel 6 of shoulder 29. That is, truncated edge 13 of camera plate 1 may face a direction away from coupling mechanism 9. As a result, and with reference to FIG. 7, truncated edge 13 may allow the user's index or shooting finger to more readily access and actuate second shutter release button 28 of camera 19. The second end of camera plate 1 may also include a tapered portion 15. Tapered portion 15 may define a section of camera plate 1, wherein a thickness of camera plate 1 decreases towards the terminal end of camera plate 1. As such, tapered portion 15 may form a surface on the top side of camera plate 1 that slopes toward the base of camera 19 when camera plate 1 is mounted to the camera base. Accordingly, and also with reference to FIG. 7, tapered portion 15 may provide an improved grip of camera plate 1, as tapered portion 15 may allow camera plate 1 to better conform to the shape of the user's hand. Camera plate 1 may also include a suitable material 18 on the peripheral edges of camera plate 1. Material 18 may be configured to provide improved grip and cushioning of camera plate 1 for the user, and may include, for example, a rubber or neoprene strip, or the like.

Figure 5:
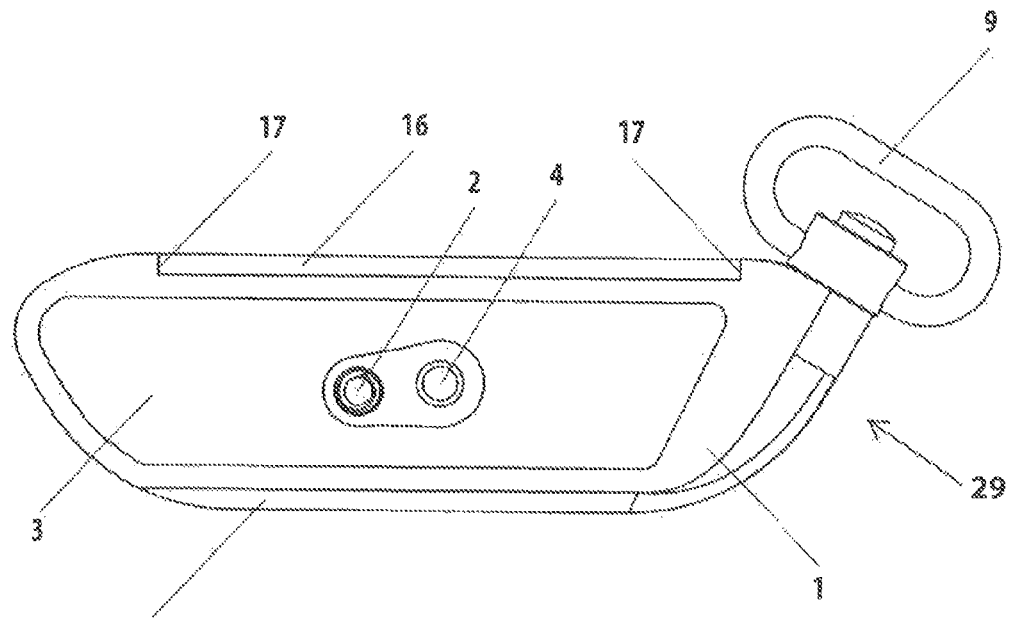
FIG. 5 illustrates a view of the camera plate and a coupling mechanism of the camera carrying and mounting system, according to an exemplary disclosed embodiment.
Figure 8:
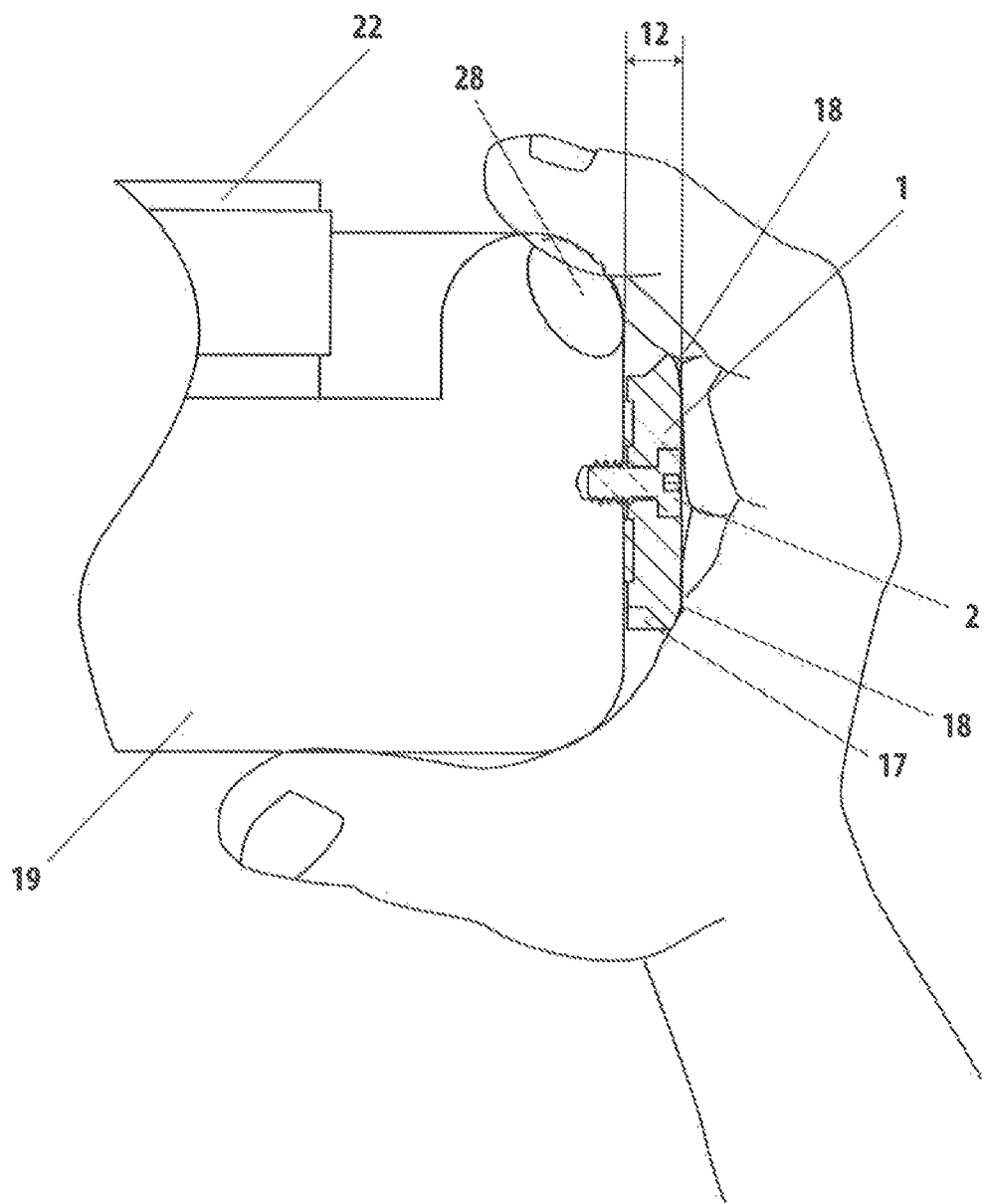
FIG. 8 illustrates a partial cross-sectional view of the camera carrying and mounting system, according to an exemplary disclosed embodiment.

In addition, and as shown in FIGS. 3, 5, and 8, for example, counter-bored hole 5 of camera plate 1 may be appropriately sized such that fastening element 2 may sit flush with the top surface of camera plate 1. For example, and with reference to FIG. 8, hole 5 may include a suitable depth such that the head of fastening element 2 may not extend beyond the top surface of camera plate 1. This feature may provide the benefit of a lower and flush profile 12 for camera plate 1, and thus the ability for the user to comfortably and securely grasp camera plate 1 and camera 19.

Figure 76:
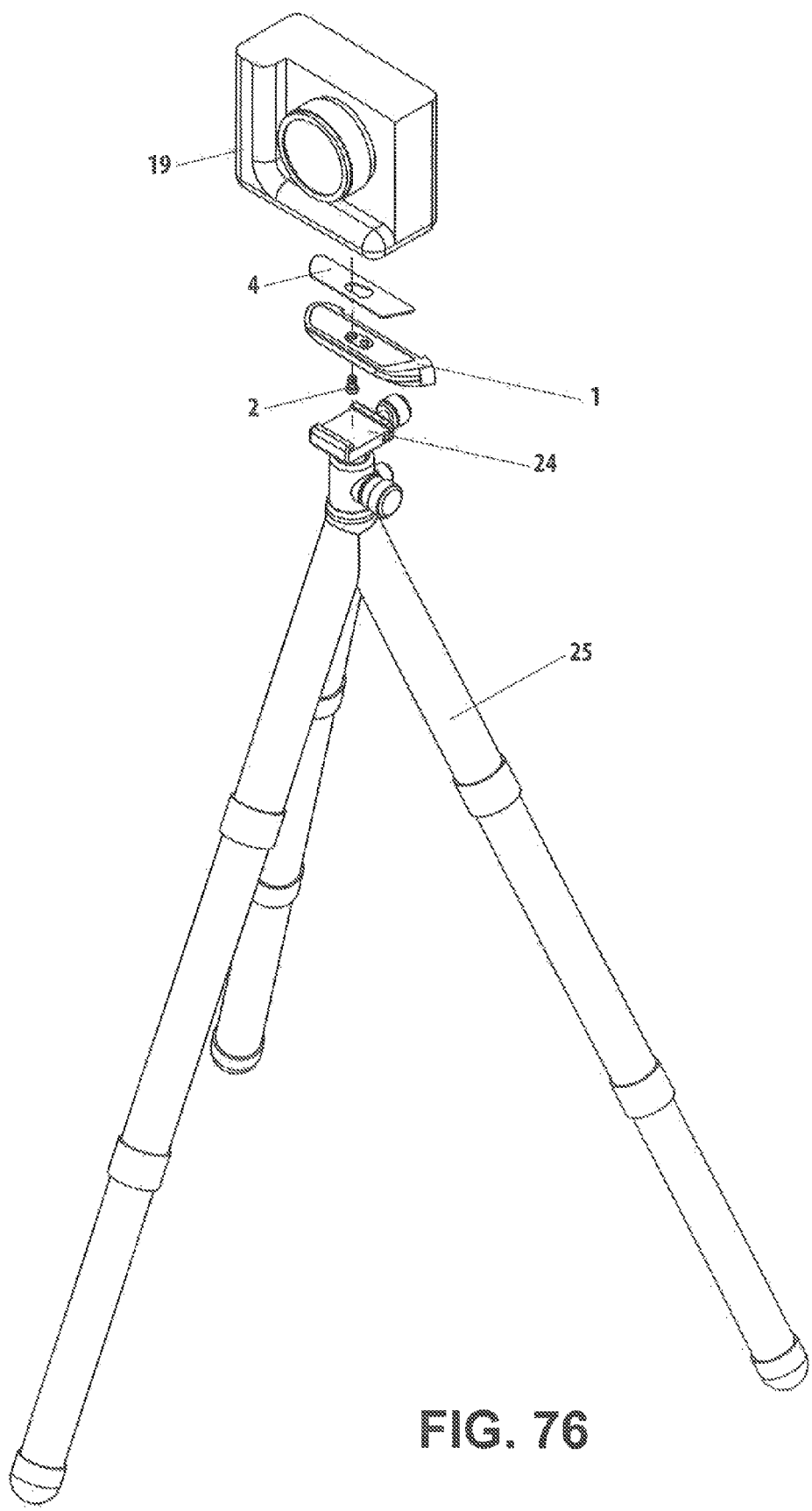
FIG. 76 illustrates a perspective view of a camera stand and components of the camera carrying and mounting system, according to an exemplary disclosed embodiment.
Figure 77:
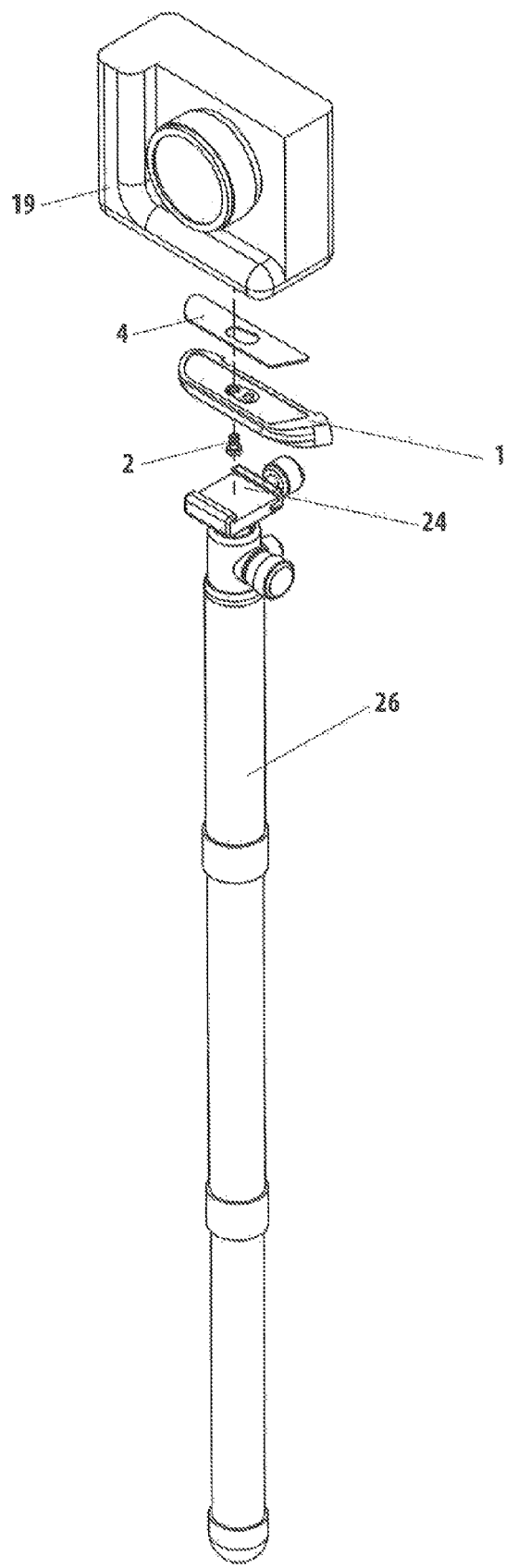
FIG. 77 illustrates a perspective view of another camera stand and components of the camera carrying and mounting system, according to an exemplary disclosed embodiment.
Figure 78:
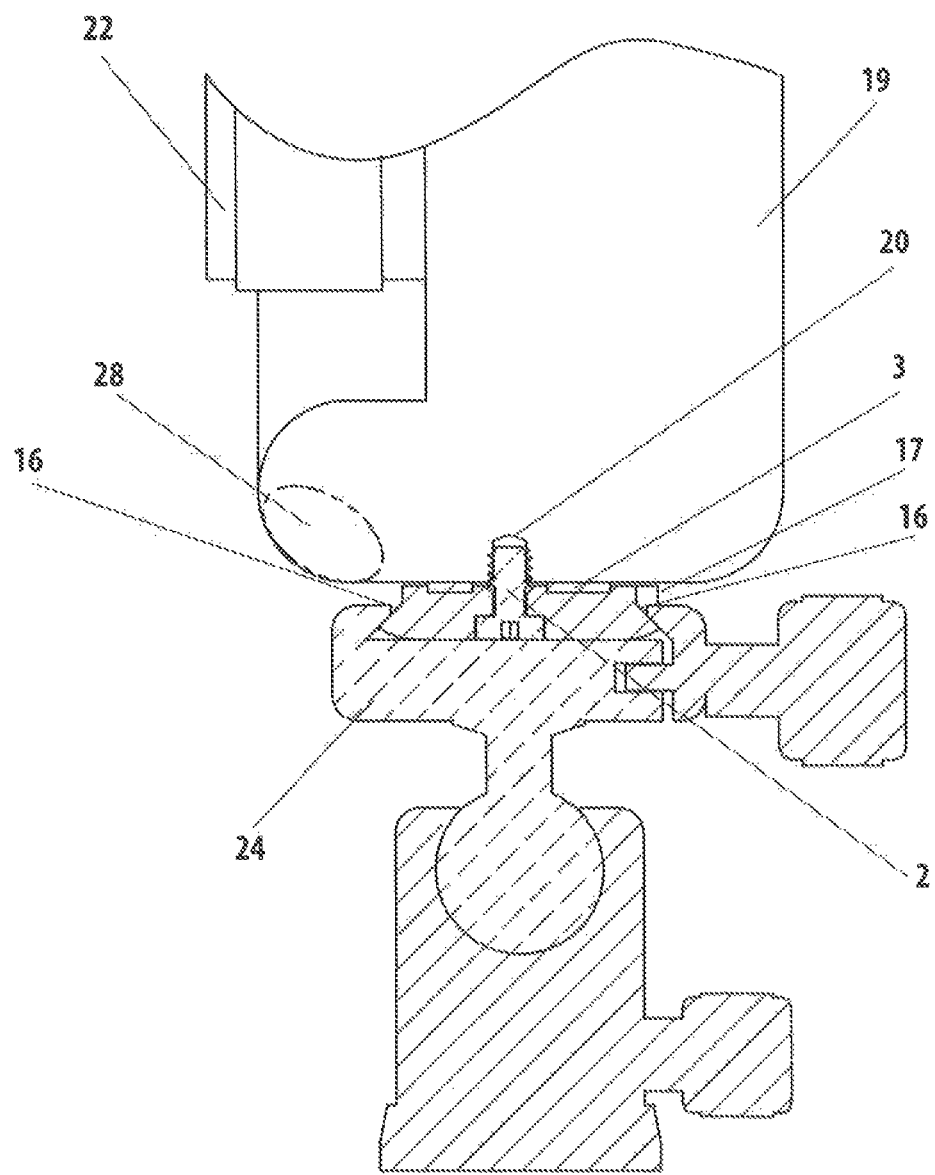
FIG. 78 illustrates a partial cross-sectional view of a portion of a camera stand and the camera carrying and mounting system, according to an exemplary disclosed embodiment.

Camera plate 1 may, additionally, or alternatively, include one or more bevels 16 and stops 17. As shown in FIGS. 3 and 4, for example, bevels 16 and stops 17 may be positioned on the bottom side of camera plate 1. Bevels 16 and stops 17 may be configured to facilitate mounting of camera 19 to other variations of camera stands, such as, for example, camera stands including quick release attachment mounts or clamps readily known in the art. For example, and with reference to FIGS. 76-78, bevels 16 of camera plate 1 may be defined on peripheral edges of camera plate 1 and may be configured to engage the arms a quick release clamp 24 of a camera stand, such as a tripod 25 (FIG. 76) or a monopod 26 (FIG. 77). In certain embodiments, camera plate 1 may include a width of 38 millimeters, and each bevel 16 may include a 45° dovetail configuration to mate with the releasable clamps of an Arca-Swiss style attachment mount. Accordingly, camera plate 1 of carrying and mounting system 100 may avow a user to readily engage and disengage camera 19 from numerous types of camera stands, including, for example, camera stands with a threaded element for installation and camera stands 25, 26 having release clamps 24 for installation. Carrying and mounting system 100 may also provide the ability to install camera 19 to these various camera stands without the need to disassemble carrying and mounting system 100 from the base of camera 19. In addition, camera plate 1 may allow coupling mechanism 9 and strap 8 to remain attached to camera plate 1 when mounting camera 19 to the camera stand. Such features obviate the need to dissemble components of carrying and mounting system 100, saving time for the user.

As alluded to above, camera plate 1 may also include stops 17 configured to prevent camera plate 1, and thus camera 19, from sliding of release clamp 24. It should be appreciated that stops 17 may be located at positions of camera plate 1 at which camera plate 1 has varying widths. Stops 17 may, for example, be located at a position at which a width of camera plate 1 is greatest. Such a feature may provide added security in situations in which clamp 24 is partially open because the arms of clamp 24 may still interfere with stops 17 should camera plate 1 begin to slide relative to clamp 24. It should further be appreciated that stops 17 may be appropriately spaced apart to accommodate any sized quick release attachment mounts or clamps known in the art.

Figure 6:
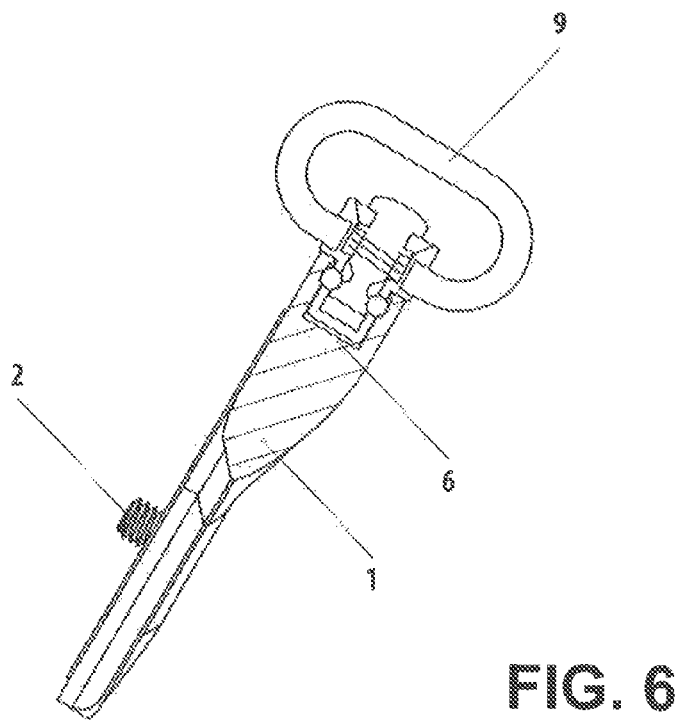
FIG. 6 illustrates a cross-sectional view of the camera plate and the coupling mechanism of the camera carrying and mounting system, according to an exemplary disclosed embodiment.

FIGS. 5 and 6 illustrate additional views of camera plate 1 and coupling mechanism 9, according to an exemplary disclosed embodiment. As discussed above, coupling mechanism 9 may be engaged and secured into channel 6 formed on shoulder 29 of camera plate 1. As shown in the cross-sectional view of FIG. 6, in some embodiments, coupling mechanism 9 may include an insertion portion configured to be inserted and secured in channel 6 and a releasable portion configured to engage and disengage from the insertion portion.

Figure 7:
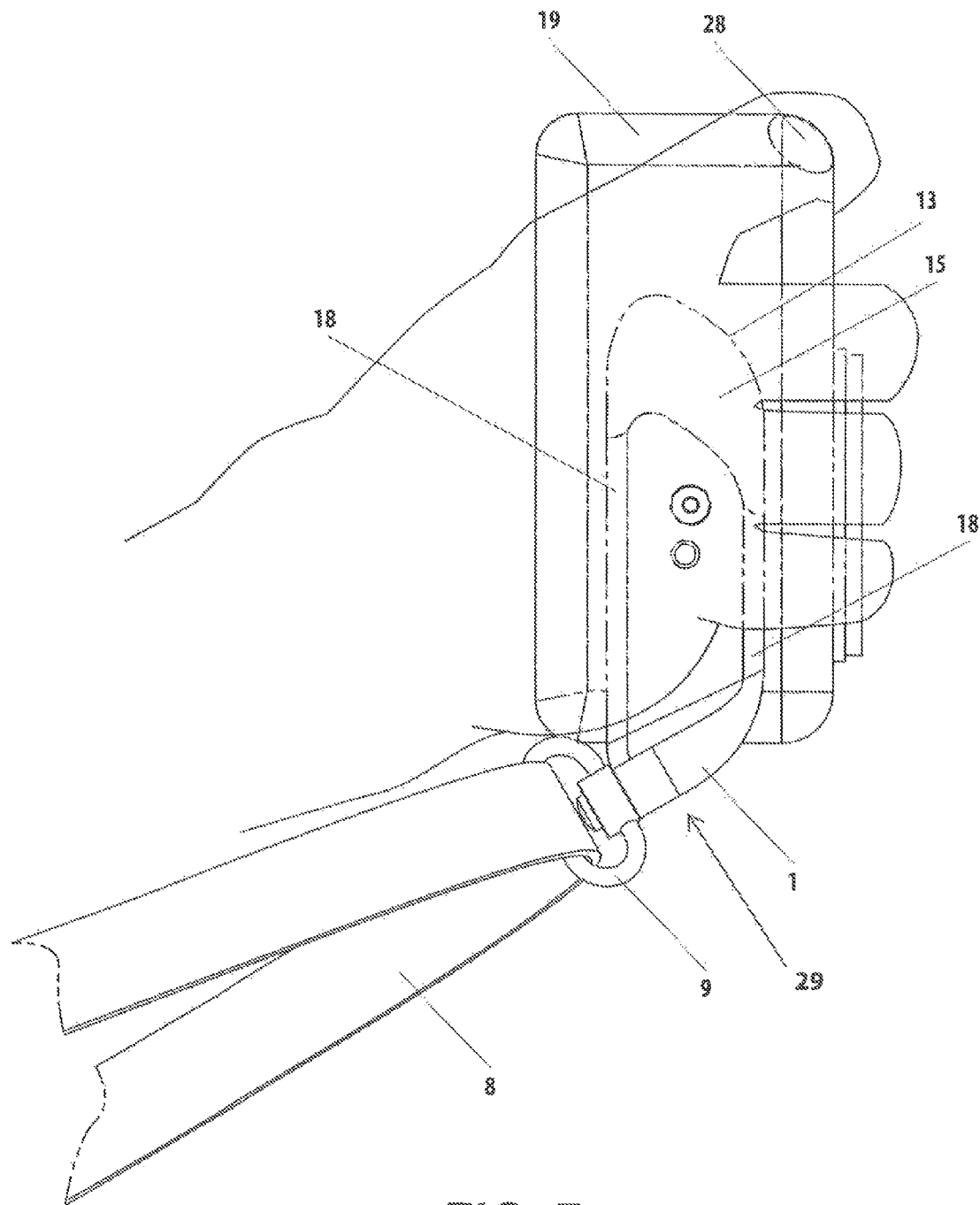
FIG. 7 illustrates a view of the camera carrying and mounting system, according to an exemplary disclosed embodiment.

Camera plate 1 may extend along a portion of the base of camera 19, as shown, for example, in FIG. 7. In other embodiments, camera plate 1 may extend along an entire length of the base of camera 19. It should be appreciated, however, that camera plate 1 may extend along any length of a base of camera 19 so long as camera plate 1 is appropriately sized to be gripped and handled by the user. In addition, camera plate 1 may also be appropriately sized such that shoulder 29 extends over a base of camera 19. Accordingly, a user may grasp camera plate 1 and a base of the camera 19 while avoiding encumbering contact with shoulder 29, coupling mechanism 9, and/or strap 8.

As is well known in the art, camera 19 may include a battery compartment (not shown). For embodiments in which a battery compartment of camera 19 may be positioned at a camera base, the feature of shoulder 29 extending over the base of camera 19 may avoid the undesired circumstance of coupling mechanism 9 and/or shoulder 29 interfering with the body of camera 19 when opening the battery compartment.

Figure 9:
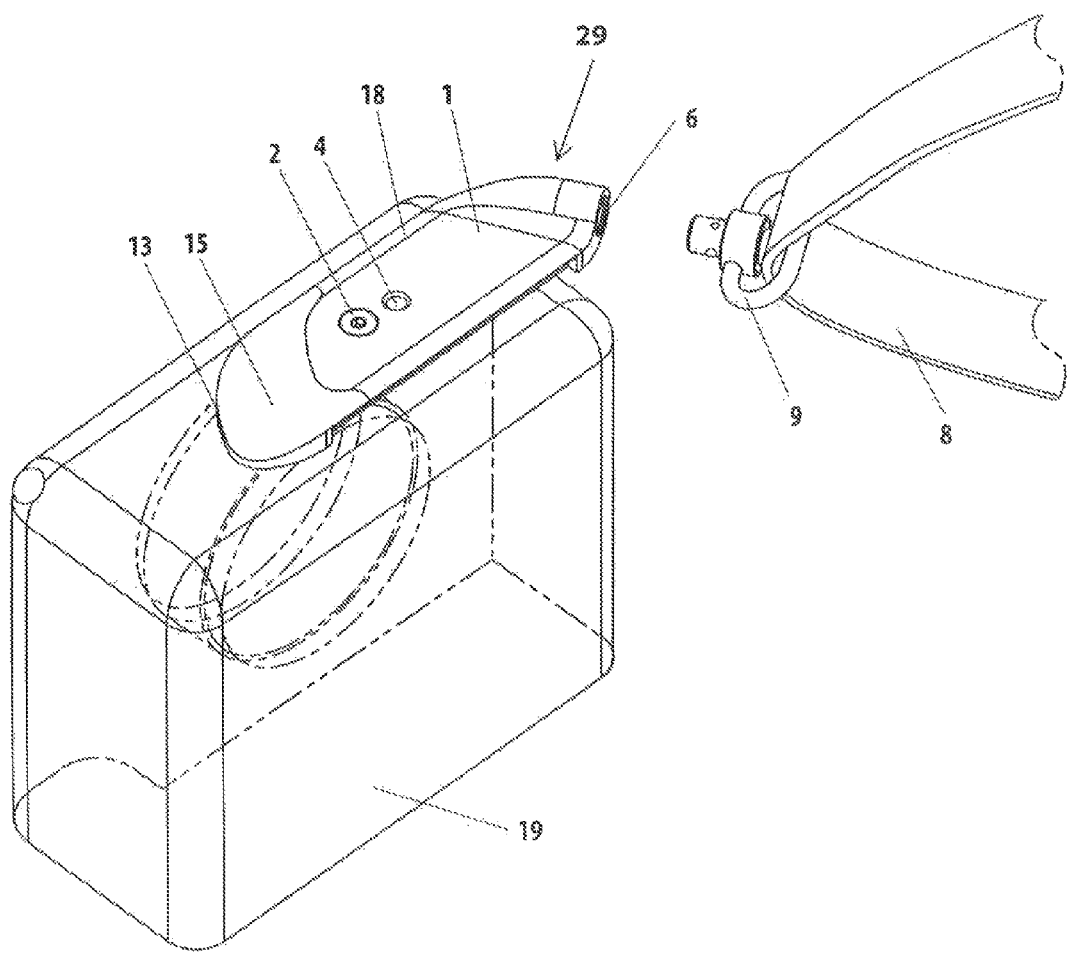
FIG. 9 illustrates a perspective view of the camera carrying and mounting system, according to an exemplary disclosed embodiment.

As discussed above, coupling mechanism 9 may be configured to readily engage and disengage strap 8 from camera plate 1, and thus camera 19. As shown in FIG. 9, coupling mechanism 9 may include, for example, a push-button fastener as known in the art. In such an embodiment, the releasable portion of the push-button fastener may be configured to engage and disengage from an insertion portion of the push-button fastener. Moreover, the releasable portion may be configured to rotate and swivel relative to shoulder 29 when engaged with the insertion portion. It should be appreciated, however, that the camera carrying and mounting system of the present disclosure may incorporate a variety of suitable fasteners or mechanisms configured to release and secure strap 8 to camera plate 1.

FIGS. 10-30 illustrate another embodiment of a coupling mechanism 90 configured to readily engage and disengage carrying structure 8 from camera plate 1. Coupling mechanism 90 may include a body portion 100 and a movable arm 101. A first end 102 of body portion 100 may include a U-shaped section 103 through which carrying structure 8 extends. Movable arm 101 may rotate relative to body portion 100. In an open position of coupling mechanism 90, movable arm 101 may decouple and rotate away from body portion 100, facilitating entry of carrying structure 8 into U-shaped section 103 of body portion 100. In a closed position of coupling mechanism 90, movable arm 101 may be coupled to body portion 100, forming a closed loop with U-shaped section 103 of body portion 100 and securing carrying structure 8 to coupling mechanism 90.

Coupling mechanism 90 may also include an attachment structure 104 for securely connecting coupling mechanism 90 to camera plate 1. In one embodiment, attachment structure 104 may include a pivoting insert 105 coupled to a second end 106 of body portion 100. Pivoting insert 105 may include an elongate section 107 disposed within a slot 108 on second end 106 of body portion 100. A pivot pin 109 may pivotably connect together elongate section 107 and body portion 100 at slot 108. Accordingly, coupling mechanism 90 may pivot or flex relative to camera plate 1. As shown in the cross-sectional view of FIG. 16, pivoting insert 105 may also include a rotatable section 110 inserted into channel 6 formed on shoulder 29 of camera plate 1. Rotatable section 110 may be configured to rotate relative to an axis of channel 6. In one embodiment, for example, rotatable section 110 may include a groove into which one or more ball bearings may be positioned. Coupling mechanism 90 may therefore also rotate relative to camera plate 1.

Figure 32:
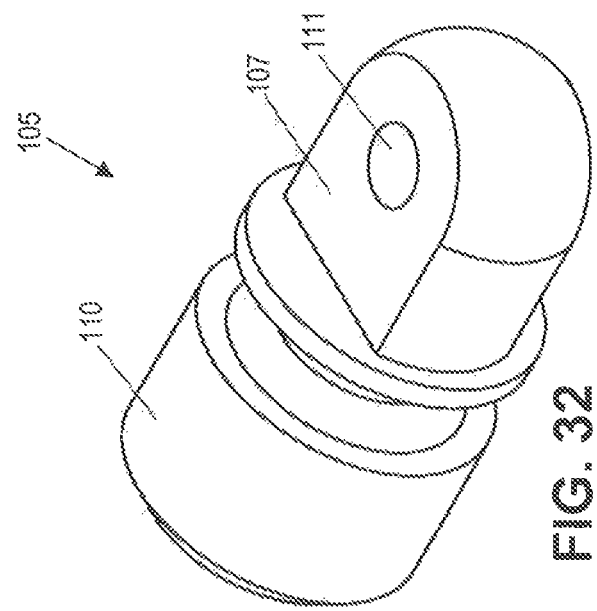
FIGS. 31-32 illustrate various views of a pivoting insert of the coupling mechanism depicted in FIGS. 10-30, according to an exemplary disclosed embodiment.
Figure 31:
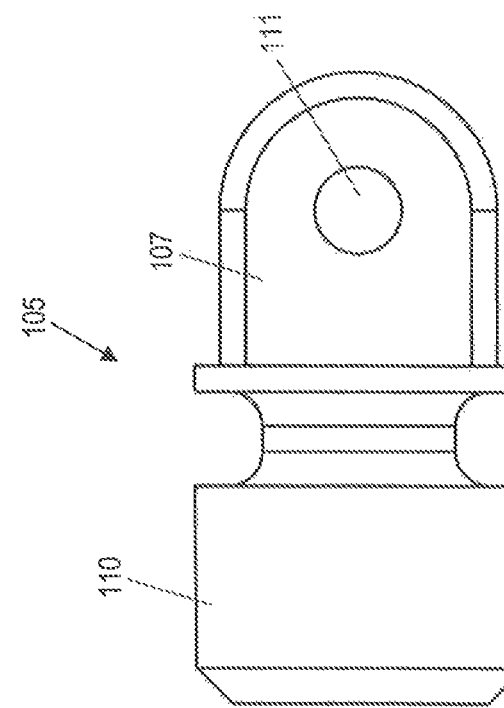
Figure 33:
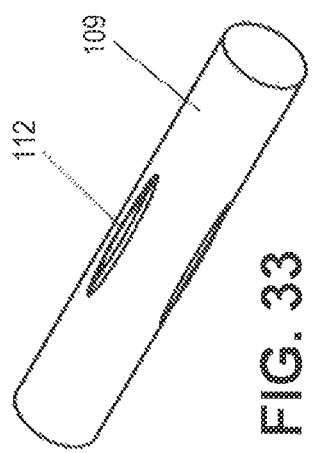
FIG. 33 illustrates a view of a pivot pin of the coupling mechanism depicted in FIGS. 10-30, according to an exemplary disclosed embodiment.

FIGS. 31-32 illustrate detailed views of pivoting insert 105, and FIG. 33 illustrates a detailed view of pivot pin 109, according to an exemplary embodiment. As shown in FIGS. 31-32, pivoting insert 105 may include an aperture 111 defined on elongate section 107 through which pivot pin 109 may extend. Furthermore, and as shown in FIG. 33, for example, pivot pin 109 may also include one or more structures 112 along its central portion, such as, for example, projections, configured to form a friction or press fit with the walls of aperture 111 of elongate section 107 and fix pivot pin 109 onto pivoting insert 105. In other embodiments, projections 112 of pivot pin 109 may be configured to engage with complementary recesses within the walls of aperture 111 of elongate section 107. Accordingly, body portion 100 of coupling mechanism 90 may pivot on the lateral sections of pivot pin 109.

Coupling mechanism 90 may therefore provide versatile movement of camera 19 when coupled to carrying structure 8 as coupling mechanism 90 may include a number of degrees of freedom relative to camera plate 1. For example, and as illustrated in FIGS. 17-23, coupling mechanism 90 may be pivoted or flexed towards a front surface of camera plate 1 facing away from camera 19. Although FIGS. 17-23 illustrate coupling mechanism 90 pivoted or flexed toward a front surface of camera plate 1, it should be appreciated that coupling mechanism 90 may also be pivoted or flexed toward a rear surface of camera plate 1 facing camera 19. In addition, and as illustrated in FIGS. 24-30, for example, coupling mechanism 90 may be rotated relative to camera plate 1 about the axis of channel 6. Although FIGS. 24-30 depict coupling mechanism 90 rotated approximately 90° relative to camera plate 1, it should be appreciated that coupling mechanism 90 may also be rotated a full 360° relative to camera plate 1 in both the clockwise and counterclockwise directions.

FIGS. 34-61 illustrate detailed views of components of coupling mechanism 90, according to an exemplary embodiment. In particular, FIGS. 34-40 disclose body portion 100 and movable arm 101 of coupling mechanism 90 in a closed and locked configuration. As alluded to above, movable arm 101 may disengage from body portion 100 to open the loop of coupling mechanism 90 and accept carrying structure 8. It should be appreciated that coupling mechanism 90 may include a locking arrangement 113 configured to engage and disengage movable arm 101 from body portion 100. In one embodiment, for example, locking arrangement 113 of coupling mechanism 90 may include a shaft 114 and a locking knob 115 configured to releasably couple movable arm 101 to body portion 100.

Figure 62:
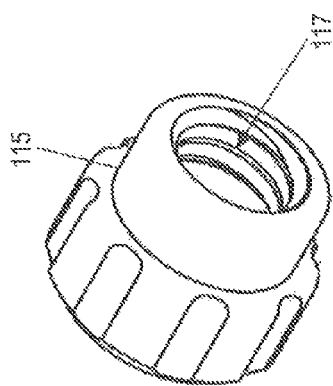
FIGS. 62-63 illustrate various views of a locking knob of the coupling mechanism depicted in FIGS. 10-30, according to an exemplary disclosed embodiment.
Figure 64:
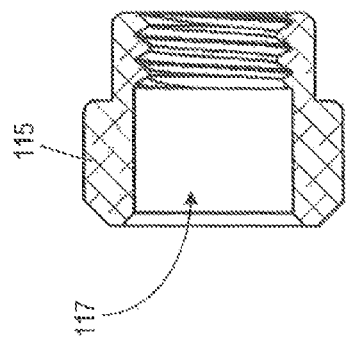
FIG. 64 illustrates a cross-sectional view along line A-A of the locking knob of the coupling mechanism depicted in FIG. 63, according to an exemplary disclosed embodiment.
Figure 63:
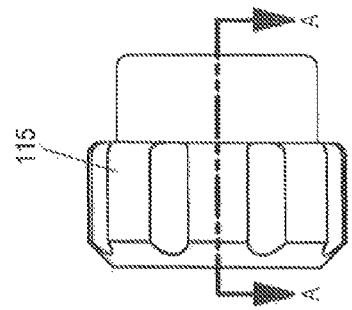
Figure 66:
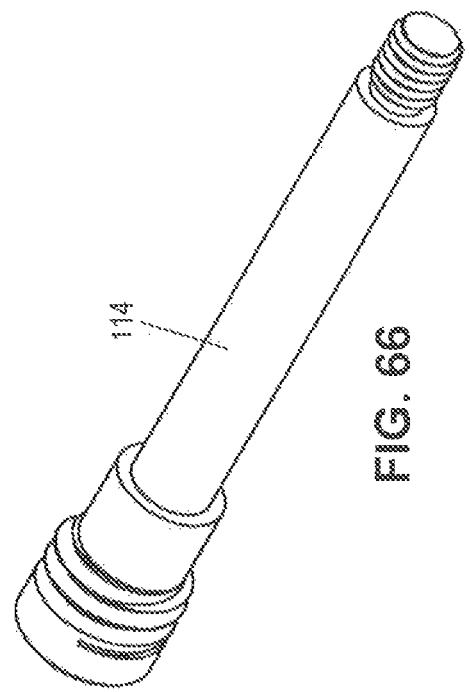
FIGS. 65-66 illustrate various views of a shaft of the coupling mechanism depicted in FIGS. 10-30, according to an exemplary disclosed embodiment.
Figure 65:
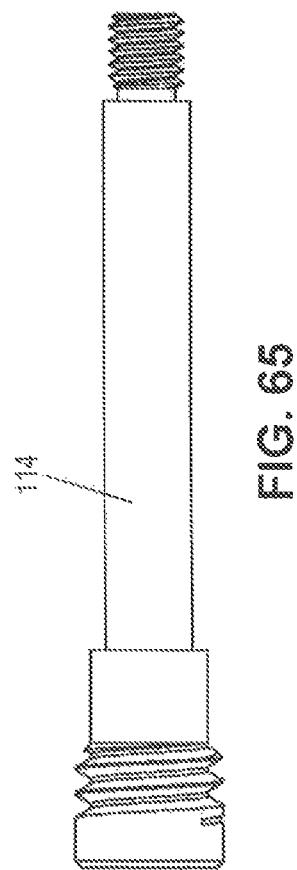

As shown in the cross-sectional view of FIG. 40, shaft 114 may extend through an internal channel 116 of body portion 100, and a first end of shaft 114 may be secured to movable arm 101 via, for example, a threaded insert and socket configuration, and a second end of shaft 114 may be coupled to locking knob 115. FIGS. 62-64 illustrate detailed views of locking knob 110, and FIGS. 65-66 illustrate detailed views of shaft 114, according to an exemplary embodiment.

As shown in FIGS. 40 and 62-64, for example, locking knob 115 may include a socket 117 having a set of threaded grooves at one end of knob 115. And, as shown in FIGS. 40 and 65-66, for example, the second end of shaft 114 may also include a set of threaded grooves configured to engage with the threaded grooves of knob socket 117. In the locked configuration of coupling mechanism 90, the threaded grooves of knob socket 117 may not engage the threaded grooves of the second end of shaft 114, and a terminal end of shaft 114 may abut a terminal end of knob socket 117.

Body portion 100 may further include a first recess 118 for housing movable arm 101 and a second recess 119 for housing locking knob 115. In particular, and as described in more detail below, a portion of movable arm 101 secured to the first end of shaft 114 may be configured to move into and out of first recess 118 with shaft 114 when coupling mechanism 90 is unlocked and in the open position. Moreover, locking knob 115 may move into and out of second recess 119 with shaft 114 when coupling mechanism 90 is unlocked and in the open position. Body portion 100 may also include a third recess 120 housing a biasing mechanism 121, such as, for example, a spring. One end of biasing mechanism 121 may abut a shoulder of third recess 120, and a second end of biasing mechanism 121 may abut a shoulder of shaft 114. Biasing mechanism 121 may therefore bias shaft 114 (and consequently movable arm 101) in the closed position.

FIGS. 41-47 illustrate detailed views of coupling mechanism 90 in an unlocked configuration, according to an exemplary embodiment. As alluded to above, and disclosed in the cross-sectional view of FIG. 47, the threaded grooves of locking knob socket 117 may mate with the threaded grooves on the second end of shaft 114. Locking knob 115 may be turned until its threaded grooves engage with the threaded grooves on the second end of shaft 114. Locking knob 115 may be turned until reaching an end stop on the threaded grooves of the second end of shaft 114, which in turn may cause at least a portion of locking knob 115 to exit second recess 119 of body portion 100. As a result, coupling mechanism 90 may be in the unlocked configuration, and a clearance may be formed between locking knob 115 and the end wall of second recess 119. As will be discussed in more detail below, the clearance may allow knob 115 and shaft 114 to be translated through channel 116 of body portion 100, which may cause movable arm 101 to disengage from body portion 100.

FIGS. 48-54 illustrate detailed views of coupling mechanism 90 in an unlocked and open configuration, according to an exemplary embodiment. As shown in the cross-sectional view of FIG. 54, locking knob 115, connected to shaft 114, may be pushed into second recess 119 with sufficient force to overcome the biasing force of biasing mechanism 121. The end wall of second recess 119 may provide an end stop for locking knob 115. As a result, shaft 114 may be translated through channel 116 of body portion 100 and towards first recess 118 of body portion 100, which may cause movable arm 101 to exit out of first recess 118.

Figure 75:
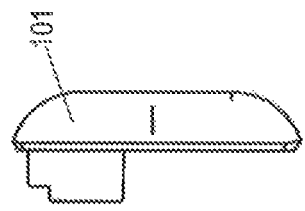
FIGS. 74-75 illustrate various views of an arm of the coupling mechanism depicted in FIGS. 10-30, according to an exemplary disclosed embodiment.
Figure 74:
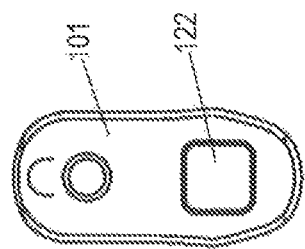

FIGS. 67-73 illustrate detailed views of body portion 100 of coupling mechanism 90, and FIGS. 74-75 illustrate detailed views of movable arm 101 of coupling mechanism 90, according to an exemplary embodiment. As shown in FIGS. 40, 47, and 67-75, for example, movable arm 101 may include a notch 122 configured to engage with a projection 123 on body portion 100 to further secure coupling mechanism 90 in the closed and locked configuration. FIG. 54 further discloses that notch 122 on movable arm 101 may be configured to disengage with projection 123 on body portion 100 when locking knob 115 and shaft 114 are translated towards first recess 118.

FIGS. 55-61 illustrate detailed views of coupling mechanism 90 in the unlocked and open configuration with movable arm 101 rotated away from body portion 100, according to an exemplary embodiment. In particular, FIGS. 55-61 disclose that locking knob 115, connected to shaft 114, may be pushed into second recess 119 and rotated relative to a longitudinal axis of channel 116 to rotate movable arm 101 away from U-shaped section 103 of body portion 100. Carrying structure 8 may then be inserted into the U-shaped section 103 of body portion 100. Coupling mechanism 90 may be closed by rotating movable arm 101 back towards the U-shaped section 103 of body portion 100 and aligning notch 122 on movable arm 101 with projection 123 on body portion 100. The inward force on locking knob 115 may be released, causing biasing mechanism 121 to resiliently bias movable arm 101 into the closed position. To lock coupling mechanism 90, locking knob 115 may be turned into second recess 119 to disengage the threaded grooves of knob socket 117 from the threaded grooves of the second end of shaft 114.

The screwable arrangement between locking knob 115 and shaft 114 may provide added security as movable arm 101 may not be disengaged without first turning locking knob 115 such that it exits second recess 119. The screwable arrangement may also provide a more low profile configuration of coupling mechanism 90 as locking knob 115 may be at least partially housed in second recess 119. It should be appreciated that in some embodiments, however, locking knob 115 may be fixedly fastened to shaft 114, similar to the configuration depicted in FIGS. 41-47, such that the user may simply push knob 115 and shaft 114 inward to disengage movable arm 101 from body portion 100.

Figure 79:
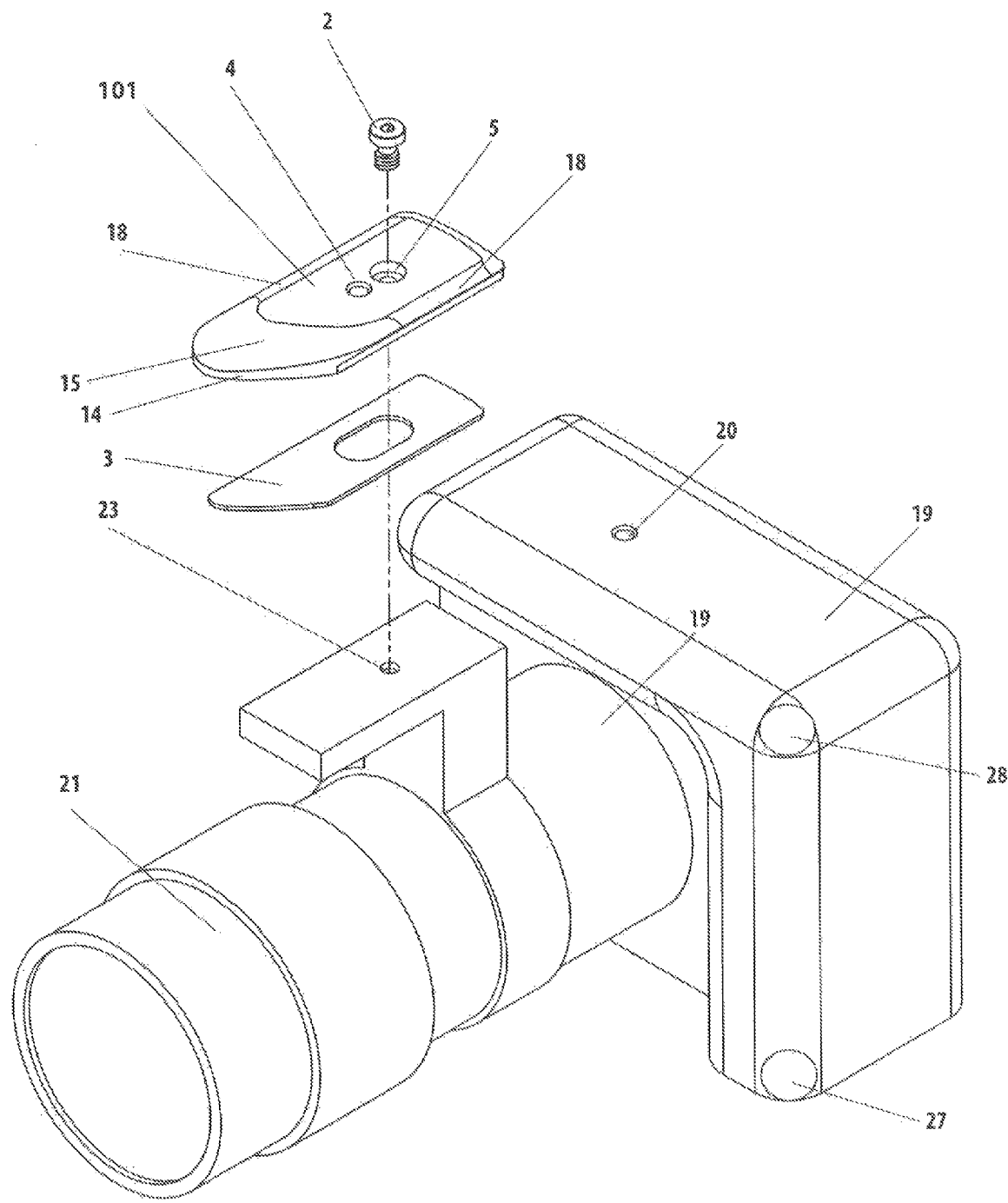
FIG. 79 illustrates a disassembled view of components of another camera carrying and mounting system, according to an exemplary disclosed embodiment.
Figure 80:
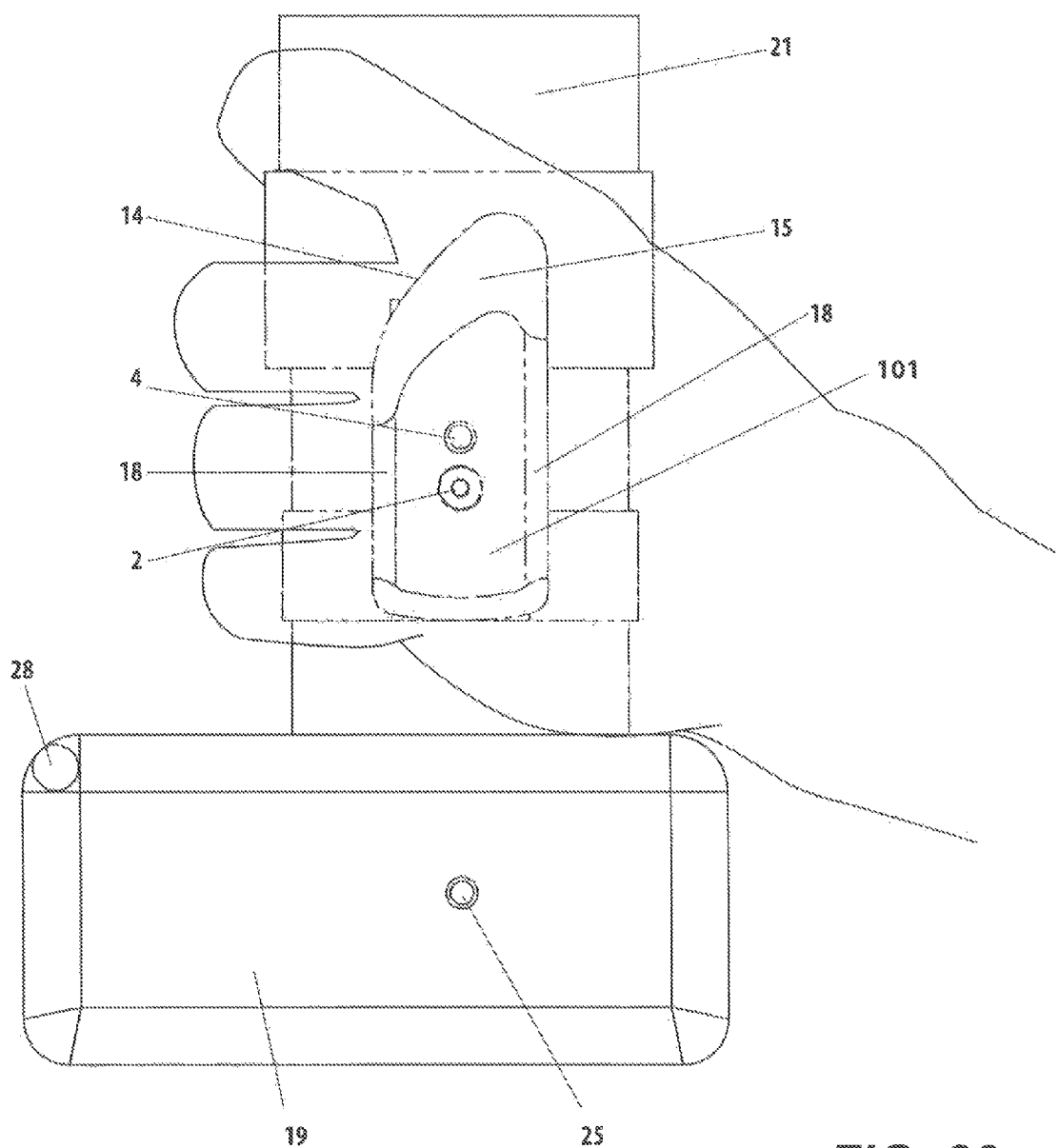
FIG. 80 illustrates a view of the camera carrying and mounting system of FIG. 79, according to an exemplary disclosed embodiment.

Although the above embodiments describe the camera carrying and mounting system engaged with a base of camera 19, it should also be appreciated that the carrying and mounting system may be engaged with any other suitable section of camera 19. For example, and as shown in FIGS. 79 and 80, the carrying and mounting system may be appropriately dimensioned and sized to engage with a stand socket 23 on a collar of a camera lens 21. In the embodiment of FIGS. 79 and 80, camera 19 may include a long camera lens 21, and in the embodiments of FIGS. 1-78, camera 19 may include a short camera lens 22. Similar to camera plate 1 disclosed above and in FIGS. 1-79, the embodiment of FIGS. 79 and 80 illustrate a camera plate 101 that may include a truncated edge 14 and tapered portion 15 configured to allow the user to more readily grasp camera plate 101 and camera lens 21. For example, and as shown in FIG. 80, truncated edge 14 may allow the user's index or active finger to more readily access and actuate camera lens 21. Moreover, and also with reference to FIG. 80, tapered portion 15 may provide an improved grip of camera plate 101, as tapered portion 15 may allow camera plate 101 to better conform to the shape of the user's hand as the user grasps camera plate 101 and camera lens 22. Although not shown in FIGS. 79 and 80, it should be appreciated that camera plate 101 may include a shoulder and a coupling mechanism as described above.

It should also be appreciated that the camera carrying and mounting system may be seamlessly integrated with camera 19. In one embodiment, camera plate 1 itself may form a base of camera 19, as opposed to being mounted (e.g., fastened or screwed) onto an existing camera base. Thus, as an example, for a camera 19 including a battery compartment on a camera base, the integrated camera plate 1 may act as a cover that opens and doses access to the battery compartment. In another embodiment, camera plate 101 may be integrally formed with a base of camera lens 21.

In some embodiments, camera plate 1, 101 may include alignment lines or similar features to ensure camera plate 1, 101 is installed perpendicular to the lens axis when mounted on camera 19 and in-line with the lens axis when mounted on the lens collar. The alignment features may also prevent an improperly tightened camera plate 1, 101 from accidentally rotating.

It should be appreciated that camera plate 1, 101 may be manufactured from plastic, metal, or any other suitably rigid material. In addition, camera plate 1, 101 may be manufactured by any suitable process, such as, for example, injection molding, die or investment casting, or machining.

As will be appreciated by one of ordinary skill in the art, the presently disclosed camera carrying and mounting system may provide a number of advantages and benefits over the existing technology. For example, the camera carrying and mounting system may provide the advantage of mounting camera 19 to a variety of different camera stands. For example, bore 4 on camera plate 1, 101 may facilitate mounting of camera 19 to a conventional camera stand having a threaded element (e.g., screw) on its mounting structure. Moreover, the shape and dimensions of camera plate 1, 101 may facilitate mounting of camera 19 to other camera stands including, for example, stands having releasable attachment mounts or clamps 24, such as an Arca-Swiss style attachment mount. It should also be appreciated that the camera carrying and mounting system may obviate the need to take apart components of the system before mounting camera 19 to the camera stand. Rather, camera plate 1, 101 of the camera carrying and mounting system may directly engage the camera stand with coupling mechanism 9, 90 and strap 8 remaining attached to camera plate 1, 101. This may save valuable time for the user in installing camera 19 on the camera stand as the user prepares for the next photograph.

The camera carrying and mounting system may additionally provide improved handling of camera 19 by the user. For example, by positioning coupling mechanism 9, 90 on an end of camera plate 1 (and in some embodiments, angled relative to camera plate 1 by way of shoulder 29), the user may grasp the base of camera 19 when taking photographs in a number of orientations, including, for example, a vertical orientation, without interference from coupling mechanism 9, 90 and/or strap 8. In addition, the ergonomic shape of camera plate 1, 101 may allow the user to securely and comfortably grasp a base of camera 19 (or camera lens 21) when orienting camera 19 for shooting. For example, truncated edge 13 of camera plate 1 may provide improved access and mobility of the user's shooting finger for actuating shutter release button 28 of camera 1, and similarly, truncated edge 14 of camera plate 101 may provide improved access and mobility of the user's active finger for actuating camera lens 21. In addition, tapered portion 15 of camera plate 1, 101 may provide an improved grip of camera plate 1, 101 by better conforming to the shape of the user's hand. The low and flush profile 12 of camera plate 1, 101 may also contribute to the secure and comfortable feel when the user grasps camera plate 1, 101 and camera 19. Along with improved comfort, these features may also reduce user fatigue, and thus may result in steadier handling of camera 19 while taking photographs.

Furthermore, and with respect to coupling mechanism 90, because coupling mechanism 90 may be anchored to and may not be readily removed from camera plate 1, coupling mechanism 90 may provide improved safety and security in connecting together camera 19 and carrying structure 8. By being securely connected to camera plate 1, coupling mechanism 90 may avoid unintended detachment between camera 19 and carrying structure 8, which may result in damage to camera 19. In addition, locking knob 115 of coupling mechanism 90 may provide added security as coupling mechanism 90 may remain dosed until locking knob 115 is actuated to an unlocked position. The secure connection between coupling mechanism 90 and camera plate 1 may also provide a single, compact structure for the camera carrying and mounting system. Accordingly, for example, coupling mechanism 90 remaining coupled to camera strap 1 when engaging and disengaging carrying structure 8 may provide a single, compact structure, which may avoid having separate parts that may be misplaced or lost.

Moreover, the pivotable and rotatable connection between coupling mechanism 90 and camera plate 1 provided by attachment structure 104 may provide improved maneuverability and versatility for the user when carrying camera 19 and positioning and moving camera 19 for shooting.

It should also be appreciated that coupling mechanism 90 may provide the advantage of engaging camera 19 to a variety of different carrying structures. In particular, by simply unlocking and moving movable arm 101 to open coupling mechanism 90, a portion of a carrying structure, such as a strap, may be positioned in U-shaped section 103 of body portion 100, and movable arm 101 may be moved back into the closed and locked position. Accordingly, the camera carrying and mounting system comprising coupling mechanism 90 may obviate the need to take apart a strap, feed the strap through coupling mechanism 90, and then reattach the strap. Moreover, such a camera carrying and mounting system may be coupled to other carrying structures, such as continuous loops that may not be easily taken apart. U-shaped section 103 of body portion 100 may simply hook onto a portion of the loop, and movable arm 101 may then close and lock the loop on coupling mechanism 90.

Any aspect set forth in any embodiment may be used with any other embodiment set forth herein. Moreover, the features set forth herein may be used with any suitable carrying structure, such as, for example, a shoulder strap, a belt, bags, purses, backpacks, and the like.

Since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A camera carrying and mounting system, comprising:
   a camera plate configured to mount onto a camera, wherein the camera plate includes a first end, a second end, a shoulder on the first end of the camera plate, and a mounting hole configured to receive a fastening element to mount the camera plate to the camera, wherein the mounting hole is positioned between the first end and the second end of the camera plate; and
   a coupling mechanism coupled to the camera plate and configured to releasably engage a carrying structure to the camera plate, wherein the coupling mechanism includes a loop through which the carrying structure extends, wherein the coupling mechanism is engaged in an aperture of the shoulder of the camera plate, wherein the aperture is disposed on a side surface of the camera plate, wherein the coupling mechanism is configured to rotate relative to the camera plate about a first axis and pivot relative to the camera plate about a second axis.

2. The camera carrying mounting system of claim 1, wherein the coupling mechanism remains coupled to the camera plate when releasably engaging the carrying structure.

3. The camera carrying mounting system of claim 1, wherein the loop is configured to open and close to releasably engage the carrying structure to the coupling mechanism.

4. The camera carrying mounting system of claim 1, wherein the coupling mechanism is configured to pivot towards a surface of the camera plate.

5. The camera carrying and mounting system of claim 1, wherein the camera plate includes a first surface facing the camera when mounted onto the camera, a second surface facing away from the camera when mounted onto the camera, and wherein the aperture is defined between the first surface and the second surface.

6. The camera carrying mounting system of claim 3, wherein the coupling mechanism includes a body portion and an arm forming the loop, wherein the arm is configured to move relative to the body portion to open and close the loop.

7. The camera carrying mounting system of claim 6, wherein the coupling mechanism includes a biasing mechanism configured to bias the arm and close the loop.

8. A camera carrying and mounting system, comprising:
a camera plate configured to mount onto a camera, wherein the camera plate includes a first end, a second end, and a shoulder on the first end of the camera plate; and
a coupling mechanism coupled to the camera plate and configured to releasably engage a carrying structure to the camera plate, wherein the coupling mechanism remains coupled to the camera plate when disengaging the carrying structure from the camera plate, wherein the coupling mechanism is configured to rotate relative to the camera plate about a first axis and pivot relative to the camera plate about a second axis, wherein the coupling mechanism is engaged in an aperture of the shoulder of the camera plate, wherein the aperture is disposed on a side surface of the camera plate.

9. The camera carrying mounting system of claim 8, wherein the coupling mechanism is configured to rotate about the shoulder of the camera plate.

10. The camera carrying mounting system of claim 8, wherein the coupling mechanism is configured to pivot towards a surface of the camera plate.

11. The camera carrying mounting system of claim 8, wherein the coupling mechanism remains coupled to the camera plate when engaging the carrying structure to the camera plate.

12. The camera carrying mounting system of claim 8, wherein the camera plate is configured to secure the camera to a camera stand with the coupling mechanism remaining coupled to the camera plate.

13. The camera carrying mounting system of claim 8, wherein the coupling mechanism is configured to directly engage the carrying structure.

14. The camera carrying mounting system of claim 13, wherein the coupling mechanism includes a loop configured to open and close to releasably engage the carrying structure to the coupling mechanism.

15. A camera carrying and mounting system, comprising:
a camera plate configured to mount onto a camera; and
a coupling mechanism coupled to the camera plate and including a body portion and an arm, wherein the arm is configured to move relative to the body portion to releasably engage a carrying structure to the coupling mechanism, wherein the camera plate is configured to secure the camera to a camera stand, wherein the body portion and the arm of the coupling mechanism remain coupled to the camera plate when disengaging the carrying structure from the coupling mechanism, wherein the coupling mechanism is configured to rotate relative to the camera plate about a first axis and pivot relative to the camera plate about a second axis.

16. The camera carrying and mounting system of claim 15, wherein the body portion and the arm form a loop through which the carrying structure extends.

17. The camera carrying and mounting system of claim 15, wherein the body portion includes a U-shaped section, and wherein the arm is configured to move relative to the body portion to open and close the U-shaped section.

18. The camera carrying and mounting system of claim 15, wherein the camera plate includes a first end, a second end, and a mounting hole configured to receive a fastening element to mount the camera plate to the camera, wherein the mounting hole is positioned between the first end and the second end of the camera plate, wherein the coupling mechanism is coupled to the first end of the camera plate.

* * * * *